United States Patent
Yamaguchi et al.

(10) Patent No.: US 6,577,820 B2
(45) Date of Patent: Jun. 10, 2003

(54) CAMERA

(75) Inventors: Motoshi Yamaguchi, Osaka (JP); Tsutomu Ichikawa, Osaka (JP); Norihiko Akamatsu, Osaka (JP); Ichiro Tsujimura, Osaka (JP); Yasushi Hasegawa, Osaka (JP); Akio Nakamaru, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/938,203

(22) Filed: Aug. 23, 2001

(65) Prior Publication Data

US 2002/0164161 A1 Nov. 7, 2002

(30) Foreign Application Priority Data

Aug. 24, 2000 (JP) ........................................ 2000-254549

(51) Int. Cl.$^7$ ............................................... G03B 15/05
(52) U.S. Cl. ......................... 396/61; 396/159; 396/163
(58) Field of Search ........................ 396/61, 159–163, 396/201, 202, 203, 204

(56) References Cited

U.S. PATENT DOCUMENTS

| | | | | |
|---|---|---|---|---|
| 4,518,237 A | * | 5/1985 | Mizokami | 396/161 |
| 5,815,743 A | | 9/1998 | Ohmori | 396/61 |
| 5,822,628 A | * | 10/1998 | Sato et al. | 396/159 |
| 6,085,040 A | | 7/2000 | Yasukawa | 396/61 |

* cited by examiner

Primary Examiner—W. B. Perkey
(74) Attorney, Agent, or Firm—Sidley Austin Brown & Wood LLP

(57) ABSTRACT

In a camera having an automatic flash light control system, a quantity of flash light illuminating an object is restricted by a value as an upper limit or a lower limit which is calculated by a distance to the object and an aperture value of a taking lens. When there is any factor for affecting the calculation of the value such as a high reflectance of the object, a specific lens system of the taking lens and a position of the flashing unit with respect to the camera, the limit value is compensated or the restriction by the value is release. When the flash light control has completed, the flash light control mode is distinguished by indication manner corresponding to the result of the actual flash light control.

30 Claims, 26 Drawing Sheets

CAMERA

This application is based on patent application 2000-254549 filed in Japan, the contents of which are hereby incorporated by references.

BACKGROUND OF THE INVENTION

1. Field of the Invention

This invention relates to a camera having an automatic flash light control system for controlling a quantity of flash light emitted from a built-in flash apparatus of the camera or an exterior type flash apparatus mounted on the camera.

2. Description of the Related Art

Conventionally, two types of flash light control system is known. In an automatic flash light control system, a quantity of reflected light component of the flash light reflected by an object is sensed by a flash light sensor while the flash light has been emitted from the flash apparatus. When the quantity of the reflected light component reaches to a predetermined value, the emission of the flash light is forcibly stopped.

In a flashmatic system, a quantity of flash light which will be emitted from the flash unit or apparatus is calculated with reference to a distance between the camera and the object and an aperture value of a taking lens which will be used for taking a photograph. The flash apparatus emits the calculated quantity of the flash light.

Furthermore, a first conventional flash light controller of a camera, for example, shown in U.S. Pat. No. 5,815,743 has a combination system of the automatic flash light control system and the flashmatic system. When a first stop signal through the automatic flash light control system is outputted faster than a second stop signal through the flashmatic system, the emission of the flash light by a flash unit or apparatus is forcibly stopped, even though the quantity of the flash light calculated in the flashmatic system has not been emitted, fully.

In a second conventional flash light controller of a camera, for example, shown in U.S. Pat. No. 6,085,040, an upper limit and/or a lower limit of a quantity of flash light emitted from a flash apparatus are/is calculated with reference to information such as a distance to an object, an aperture value of a taking lens, and the quantity of the flash light emitted from a flash apparatus is controlled through the automatic flash light control system by using the upper and/or the lower limit.

In the second conventional flash light controller of the camera, it is assumed that the upper limit and/or the lower limit of the quantity of the flash light include(s) only error component caused by sensing error of the distance to the object depending on information of a focal length of a taking lens. Thus, when the upper limit and/or the lower limit of the quantity of the flash light include(s) another error component caused by another factor, it is impossible to control the quantity of the flash light precisely.

For example, when the flash light is bounded on a ceiling or a wall, when a diffuser is used for diffusing the flash light, or when a plurality of flash apparatuses are used, an actual quantity of the flash light illuminating the object will be varied, even though the total quantity of the flash light emitted from the flash apparatus(es) is the same. Thus, the quantity of the flash light calculated in the flashmatic system (hereinafter, abbreviated as "criterion value") will be improper. Furthermore, when the flash apparatus is apart from a camera body, the distance to the object sensed by the camera will be different from the actual distance between the object and the flash apparatus. Thus, the quantity of the flash light calculated with reference to the distance to the object sensed by the camera in the flashmatic system will include error component.

When a power of the flash apparatus is smaller such as the built-in flash apparatus of the camera, the distance to the object or the aperture value of the taking lens which can be controlled through the flashmatic system will be restricted. Furthermore, when a taking lens includes a factor for restricting the quantity of flash light, for example, when an open aperture value of a taking lens is larger, when a taking lens has a specific function such as a tilt function, or when a filter is adapted in an optical path of a taking lens, the flash light amount determined in the flashmatic system will include error component with respect to a proper quantity of the flash light.

When a specific timing for emitting the flash light is selected in the camera such as in a rear shutter blade synchro-flash mode or a self-timer photographing mode, the criterion value in the flashmatic system will be improper to be used as the upper limit and/or the lower limit of the quantity of the flash light controlled through the automatic flash light control system.

When the criterion value in the flashmatic system includes any error component, it will be the cause of the failure for taking a photograph that the quantity of the flash light controlled through the automatic flash light control system is restricted by the improper criterion value as the upper limit and/or the lower limit. Thus, it is necessary to correct the criterion value or to release the upper limit and/or the lower limit of the quantity of the flash light by the criterion value in the automatic flash light control system.

SUMMARY OF THE INVENTION

An object of the present invention is to provide a camera having an automatic flash light control system in which an upper limit and/or a lower limit of a quantity of flash light by a criterion value, that is, flash light amount calculated in a flashmatic system will be corrected or released when the criterion value includes error component.

In a camera in accordance with an aspect of the present invention, a light quantity sensor senses a quantity of reflected flash light which is emitted from a flash light source, reflected by an object and reaches to a plane to be exposed. A flash light controller controls a quantity of flash light emitted from the flash light source by stopping emission of the flash light with reference to the quantity of the flash light sensed by the light quantity sensor. A distance sensor senses a distance to the object. A luminance sensor senses a luminance of the object. An aperture value selector selects an aperture value of a taking lens corresponding to the luminance of the object or selection by an operator. A limit quantity calculator calculates an upper limit and/or a lower limit of the quantity of the flash light which will be emitted from the flash light source with reference to the distance to the object and the aperture value selected by the aperture value selector. A quantity restrictor restricts the quantity of the flash light which will be controlled by the flash light controller corresponding to the upper limit and/or the lower limit of the quantity of the flash light calculated by the limit quantity calculator.

By such a configuration, when the quantity of the flash light sensed by the light quantity sensor reaches to a predetermined value, the emission of the flash light is forcibly stopped so that an object to be exposed such as a silver-halide film or a solid-state imaging device can be exposed by the predetermined quantity of the flash light. When the quantity of the flash light controlled by the flash light controller is larger than the upper limit or the smaller than the lower limit, the quantity of the actual flash light emitted from the flash light source is restricted by the upper limit or the lower limit. Thus, it is possible to prevent the occurrence of the erroneous photographing, for example, when a reflectance of the object is much higher or much lower than a standard value of the reflectance.

Furthermore, the camera further comprises an input unit for inputting parameter information with respect to parameters which will affect an accuracy of the upper limit and/or the lower limit of the quantity of the flash light calculated by the limit quantity calculator, and a compensator for compensating the upper limit and/or the lower limit of the quantity of the flash light calculated by the limit quantity calculator corresponding to the parameter information.

By such a configuration, when there is an erroneous factor for affecting the calculation of the upper limit and/or the lower limit by the limit quantity calculator, for example, when the taking lens has a specific lens system, when a panel such as a diffuser is mounted on the flash light source, or when the accuracy for sensing the distance to the object by the distance sensor is too low to use the distance to the object for calculating the upper limit and/lower limit, the upper limit and/or the lower limit can be compensated. Thus, it is possible to prevent the occurrence of the erroneous photographing due to improper upper limit and/or lower limit.

On the other hand, when the camera further comprises a display device for indicating that the flash light control has completed and a display controller for indicating a first indication on the display device when the emission of the flash light is stopped without any restriction by the quantity restrictor, and for indicating a second indication different from the first indication on the display device when the emission of the flash light is stopped with the restriction by the quantity restrictor, the flash light control mode can be distinguished by indication manner corresponding to the result of the actual flash light control.

Alternatively, when the camera further comprises a display device for indicating that the flash light control has completed, a first judger for judging whether the upper limit and/or the lower limit is larger and/or smaller than a predetermined quantity of the flash light, a second judger for judging whether the quantity of the flash light controlled by the flash light controller is larger or smaller than the predetermined quantity of the flash light, and a display controller for controlling the indicating on the display device corresponding to results of the judgment by the first judger and the second judger, the flash light control mode can be distinguished by indication manner corresponding to the result of the actual flash light control.

DETAILED DESCRIPTION OF THE EMBODIMENT

Figure 1:
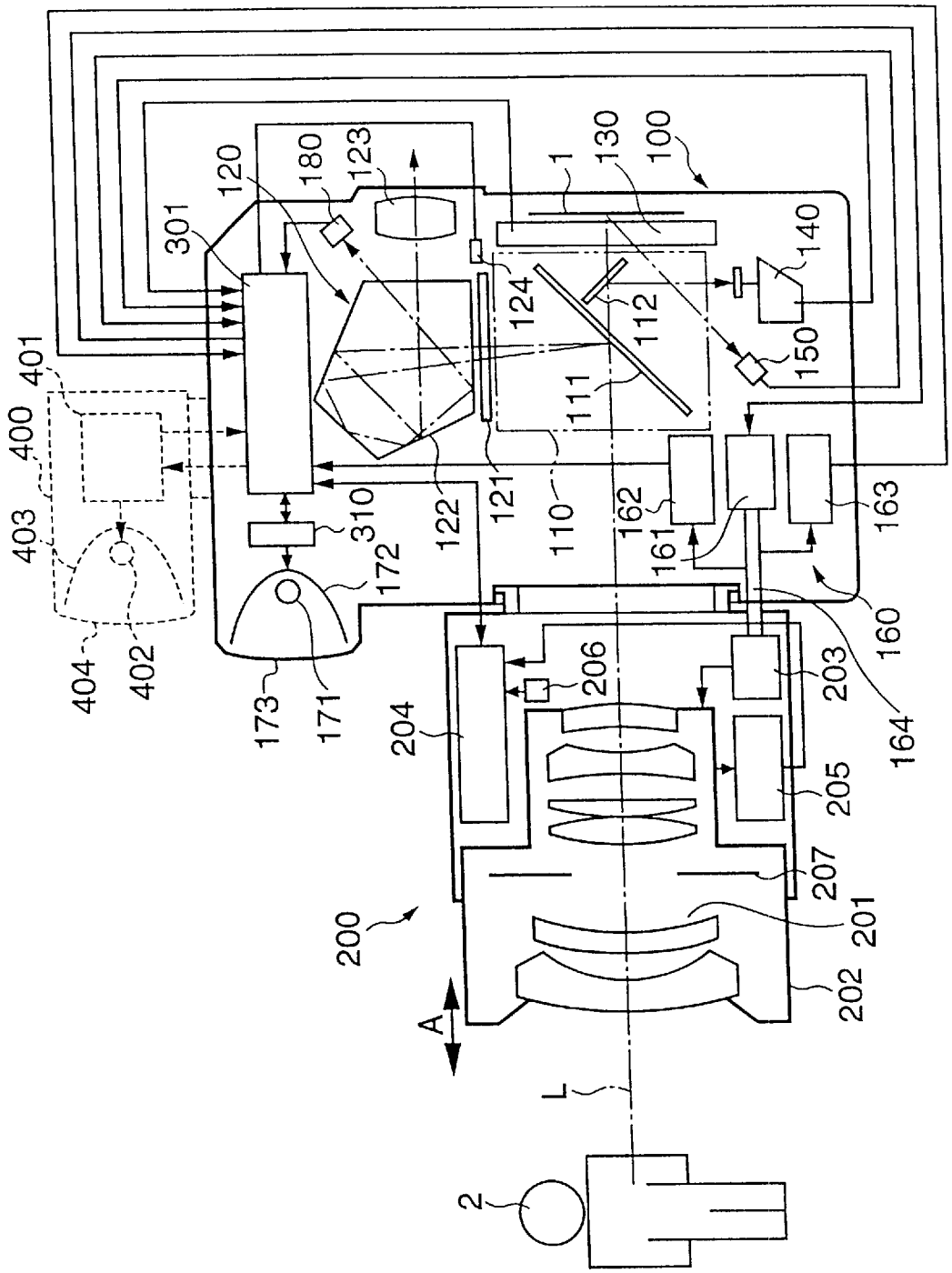
FIG. 1 is a block diagram for showing a configuration of an automatic focusing type single lens reflex camera (AF-SLR camera) having an automatic flash light control system in accordance with an embodiment of the present invention.

An embodiment of the present invention is described. FIG. 1 shows a configuration of an AF-SLR camera having an automatic flash light control system in accordance with the embodiment.

A mirror box 110 is disposed substantially at the center of a camera body 100. The mirror box 110 includes a main mirror 111 slanted by 45 degrees with respect to an optical axis L and an secondary mirror 112 hinged on and perpendicular to a back face of the main mirror 111.

A shutter unit 130 is provided between a back face of the mirror box 110 and a film guiding rail on which a film 1 is disposed. A finder unit 120 is disposed above the mirror box 110. The finder unit 120 includes a focusing screen 121, a pentagonal prism 122, an eyepiece lens 123 and a finder display device 124.

A built-in flash apparatus 170 for emitting flash light is disposed above the finder unit 120. The built-in flash apparatus 170 includes a light emission control circuit 310, a flashing tube 171 such as a xenon tube for converting electric energy outputted from the light emission control circuit 301 to light energy by discharging the electric energy, a reflection plate 172 for reflecting the flash light emitted from the flashing tube 171 forward the camera, and a Fresnel lens 173 for condensing or diffusing the flash light in a predetermined area.

An exterior type flash apparatus 400 can be mounted on a shoe of the camera body 100. The exterior type flash apparatus 400 includes a light emission control circuit 401, a flashing tube 402, a reflection plate 403 and a Fresnel lens 404. The exterior type flash apparatus 400 has a high power for emitting a larger quantity of flash light than that of the built-in flash apparatus 170. Furthermore, the exterior type flash apparatus 400 can vary the direction for emitting the flash light. In other words, the object can be illuminated by bounded flash light reflected by a ceiling or walls, when the exterior type flash apparatus 400 is used. The exterior type flash apparatus 400 can be connected to the camera body 100 not only by being mounted on the shoe, but also by using an exclusive cable. The latter case is called "off-camera connection". Furthermore, the exterior type flash apparatus 400 can be connected to the camera body 100 via wireless communication adapters. This connection is called "wireless connection". Still furthermore, the exterior type flash apparatus 400 can be controlled in synchronism with the built-in flash apparatus 170 and/or another exterior type flash apparatus. This is called "multiple light emission". A diffuser for softening the flash light, a wide panel or a telescopic-panel for varying the angle of the illumination by the flash light can be adapted on the exterior type flash apparatus 400.

When the exterior type flash apparatus 400 is connected to the camera body 100, a body controller 301 in the camera body 100 communicates a flash controller in the light emission control circuit 401 for taking information with respect to the exterior type flash apparatus 400 so as to control the flashing photograph with using the exterior type flash apparatus 400. The information includes a connection manner between the exterior type flash apparatus 400 and the camera body 100 such as the off-camera or the wireless, a number of flash apparatus connected to the camera body 100, on and off of the adapter such as the diffuser, the panel on the exterior type flash apparatus 400, and the direction for emitting the flash light.

An AF (Automatic Focusing) sensor unit 140 having a plurality of focus detecting areas, a flash light sensor 150 having a plurality of light sensing areas and an AF driving unit 160 for controlling movement of a interchangeable lens 200 are disposed below the mirror box 110.

Figure 2:
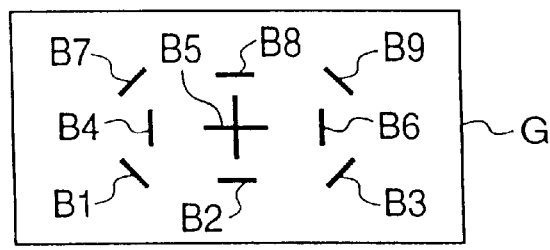
FIG. 2 is a schematic plan view for showing an arrangement of automatic focusing sensors in an AF sensor of the camera in accordance with the embodiment.

The AF sensor unit 140 senses a focusing condition by using a phase-contrast detection method. As shown in FIG. 2, the AF sensor unit 140 has nine detecting areas B1 to B9 which are arranged as a matrix of 3×3 in an imaging area G. The AF sensor unit 140 senses defocus quantities with respect to the detecting areas B1 to B9 and outputs the defocus quantities to the body controller 301. The body controller 301 calculates a distance to an object 2 based on the defocus quantities and other several information.

Figure 3:
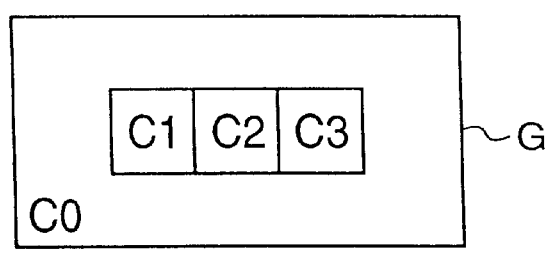
FIG. 3 is a schematic plan view for showing an arrangement of flash light sensing areas in a flash light sensor of the camera in accordance with the embodiment.

The flash light sensor 150 receives the flash light reflected by the object 2 and re-reflected by a surface of the film 1 for controlling the quantity of the flash light emitted from the built-in flash apparatus 170 and/or the exterior type flash apparatus 400 by using a TTL (Through The Lens) type flash light control system. As shown in FIG. 3, the flash light sensor 150 has four flash light sensing areas C0 to C3. The flash light sensing area C0 corresponds to peripheral portion of the imaging area G except the center portion, and the light sensing areas C1 to C3 respectively correspond to the center portion of the imaging area G. The flash light sensor 150 includes four sets of a photo-electro converting device such as a photo-diode and a condenser lens corresponding to the flash light sensing areas C0 to C3.

The flash light sensor 150 senses a total quantity of the light reflected by the surface of the film 1 while the flash apparatus 170 and/or 400 has been emitting the flash light, and outputs a signal corresponding to the total quantity of the light to the body controller 301. The body controller 301 has a function called "TTL flash light control" for controlling the quantity of the flash light emitted from the flash apparatus 170 and/or 400. When the body controller 301 judges that the total quantity of the flash light reflected by the surface of the film 1 reaches to a predetermined quantity (control value) with reference to the signal from the flash light sensor 150, it forcibly stops the emission of the flash light by the flash apparatus 170 and/or 400.

The body controller 301 further has a flashmatic function for calculating an amount of flash light (criterion value) based on a distance to an object distance and an aperture value, which will be emitted from the flash apparatus 170 and/or 400 with reference to the distance to the object 2 and an aperture value of the interchangeable lens 200 which is selected as an exposure control value. The body controller 301 uses the calculated criterion value as an upper limit or a lower limit of the quantity of the flash light in the TTL flash light control. In other words, the quantity of the flash light emitted from the flash apparatus 170 and/or 400 is basically restricted equal to or less/larger than the criterion value.

When any element or condition for causing error component for calculating the criterion value is selected, the body controller 301 compensates the value of the criterion value corresponding to the substance of the element or condition. Alternatively, the body controller 301 releases the flashmatic so as not to restrict the quantity of the flash light emitted from the flash apparatus 170 and/or 400 by the criterion value. For example, when the exterior type flash apparatus 400 is connected to the camera body 100 as the off-camera connection or the wireless connection, the distance to the object 2 sensed in the camera body 100 will be improper to be used for calculating the criterion value, so that the criterion value in the flashmatic will include error component. When the direction for emitting the flash light by the exterior type flash apparatus 400 is varied for illuminating the object 2 by bounding flash light, or when a diffuser, wide panel or the like is mounted in front of the exterior type flash apparatus 400, the flash light will be diffused or absorbed in the way to the object 2, so that the object 2 will be illuminated by insufficient quantity of the flash light. Thus, the criterion value will be improper as the upper limit value of the quantity of the flash light in the TTL flash light control. The body controller 301 compensates the criterion value or releases the upper limit by the criterion value.

In the TTL flash light control, total quantity of light reflected by the surface of the film 1 is sensed by the flash light sensor 150, so that it has an advantage that the quantity of the flash light emitted from the flash apparatus 170 and/or 400 can continuously be controlled. It, however, has a disadvantage that the total quantity of the light sensed by the flash light sensor 150 can easily be affected by variation of reflectance of the object 2 and the background. Thus, it is necessary to restrict the quantity of the flash light emitted from the flash apparatus 170 and/or 400 by the criterion value.

On the other hand, when the upper or lower limit by the criterion value is improper, it will be the cause of the erroneous flashing photograph. Thus, the body controller 301 compensates the criterion value or releases the upper limit by the criterion value in the TTL flash light control, when any element or condition causing the error component in the criterion value exists.

In the above-mentioned error component in the criterion value is mainly caused by the element or condition with respect to the exterior type flash apparatus 400. There are several elements or conditions with respect to the camera body 100 and the interchangeable lens 200 causing the error component in the criterion value. In the flashmatic system, the distance to the object 2 from the camera body 100 and the aperture value of the interchangeable lens 200 are used as parameters for calculating the criterion value. When an element for reducing the accuracy for sensing the distance to the object or the aperture value exists, it is necessary to compensate the criterion value or to release the limitation by the criterion value. Similarly, when an element for changing a relation between the quantity of the flash light emitted from the flash light source and a quantity of illumination light on the object 2 or a relation between the reflected light by the object 2 and the reflected light by the film 1, it is also necessary to compensate the criterion value or to release the limitation by the criterion value.

The AF driving unit 160 shown in FIG. 1 is configured by an AF actuator 161, a distance encoder 162, an AF encoder 163 and an output shaft 164. The AF actuator 161 further includes a motor such as a DC motor, a stepping motor, an ultrasonic motor, or the like and a reduction system for reducing the rotation speed of the output from the motor, which are not shown in the figure. The output shaft 164 transmits the driving force of the AF actuator 161 to a lens driving mechanism 203 in the interchangeable lens 200. The distance encoder 162 and the AF encoder 163 respectively detect the rotation number of the output shaft 164 for calculating the distance to the object 2 from the camera body 100.

The distance encoder 162 is configured by an encoder plate fixed on the output shaft 164 and a sensing terminal contacting with an encoder pattern on the encoder plate. When the output shaft 164 rotates, the distance encoder 162 outputs pulse signals corresponding to a quantity of rotation angle of the output shaft 164 to the body controller 301. The body controller 301 calculates a displacement of a taking lens system 201 in the interchangeable lens 200 with respect to a standard point such as the infinity by using the pulse signals from the distance encoder 162, so that the position of the taking lens system 201 can be calculated.

The AF encoder 163 is configured by a blade member fixed on the output shaft 164 and a photo-reflector for sensing the quantity of rotation angle of the output shaft 164. When the output shaft 164 rotates, the AF encoder 163 outputs pulse signals corresponding to the quantity of the rotation angle of the output shaft 164 to the body controller 301. The distance encoder 162 and the AF encoder 163 have similar functions. The distance encoder 162, however, senses the displacement of the taking lens system 201 in the interchangeable lens 200 with no relation to the automatic focusing control or the manual focusing control when the taking lens system 201 is moved. The distance encoder 162 serves as substantially the same function as a distance encoder 205 in the interchangeable lens 200. Since the distance encoder 162 is provided in the camera body 100, the distance to the object 2 from the camera body 100 can be sensed even when a taking lens with no distance encoder is mounted on the camera body 100.

On the other hand, the AF encoder 163 is used when the body controller 301 automatically controls the focusing of the interchangeable lens 200. By means of the AF encoder 163, the distance to the object 2 can be obtained based on information including a defocus quantity while the taking lens system 201 moves and the taking lens system 201 has not yet reached infocus position.

For calculating the criterion value in the flashmatic control, any of the distances to the object 2 sensed by the distance encoder 162, the AF encoder 163 and the distance encoder 205 in the interchangeable lens 200 can be used. In this embodiment, when the the taking lens system 201 is infocus position and the focusing accuracy is higher, the body controller 301 uses the distance sensed by the distance encoder 205 in the interchangeable lens 200. When the taking lens system 201 is infocus position but the focusing accuracy is lower (including the case that the taking lens has no distance encoder), the body controller 301 uses the distance sensed by the distance encoder 162. While the taking lens system 201 moves and the taking lens system 201 has not yet reached infocus position such as for taking an image of moving object in an oyt-of focus condition, the body controller 301 obtains the distance by means of an information sensed by the AF encoder 163.

The interchangeable lens 200 comprises the taking lens system 210, a lens barrel system 202 for holding the taking lens system 201, the lens driving mechanism 203 for moving the lens barrel system 202 in a direction shown by arrow "A" parallel to the optical axis L of the taking lens system 201, a lens controller 204 for memorizing focal lengths of the taking lens system and aperture values of the taking lens system 201, the distance encoder 205 for sensing a displacement of the lens barrel system 202, an end switch system 206 for sensing moving limits of the lens barrel system 202, and an aperture mechanism 207. When the taking lens system 201 is a zoom lens in which the focal length thereof can be varied, the open aperture value of the taking lens system may vary corresponding to the variation of the focal length. The lens controller 204 memorizes not only the variation of the focal length and the variation of the open aperture value and the largest aperture value of the taking lens system 201, but also an AF open aperture value used for selecting detecting areas in the AF sensor unit 140 corresponding to the AF open aperture value. The end switch system 206 senses a standard position and an end position between which each element of the lens barrel system 202 can be moved.

Detection signals from the distance encoder 205 and the end switch system 206 are inputted to the lens controller 204, and the lens controller 204 transmits the detection signals to the body controller 301. The body controller 301 calculates the infocus position of the taking lens system 201 of the interchangeable lens 200 (or the distance to the object 2 from the camera body 100) by using the detection signals from the distance encoder 205. When the body controller 301 receives the detection signal from the end switch system 206, it is judged that the taking lens system 201 or the lens barrel system 202 reaches to the standard position or the end position.

The lens driving mechanism 203 is configured by a helicoid and a gear system for rotating the helicoid, and so on, which are not shown in the figure. When the driving force of the AF actuator 161 is transmitted to the lens driving mechanism 203 via the output shaft 164, the lens barrel system 202 with the taking lens system 201 are integrally moved in the direction shown by arrow "A". The displacement and the moving direction of the lens barrel system 202 with the taking lens 201 are governed by the rotation number and the rotation direction of the AF actuator 161.

Most of the light beams passing through the taking lens system 201 are reflected toward the focusing screen 121 by the main mirror 111, and the remainder pass through the main mirror 111. The light beams passing through the main mirror 111 is reflected toward the AF sensor unit 140 by the secondary mirror 112. Right and left of an image focused on the focusing screen 121 is switched by the pentagonal prism 122, so that the user of the camera can be observed the image of the object, normally.

Figure 4:
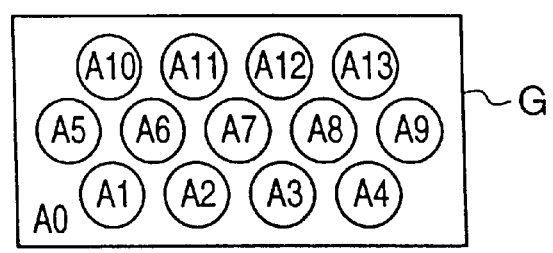
FIG. 4 is a schematic plan view for showing an arrangement of photo-sensing areas of a photo sensing unit of the camera in accordance with the embodiment.

A photo-sensing unit 180 is disposed in the vicinity of an exit plane of the pentagonal prism 122. The photo-sensing unit 180 senses the luminance of the object 2 by receiving light beams passing through the taking lens system 201 of the interchangeable lens 200. As shown in FIG. 4, the photo-sensing unit 180 has thirteen number of photo-sensing areas A1 to A13 arranged honeycomb shape and a photo-sensing area A0 around the areas A1 to A13. The photo-sensing unit 180 includes plural sets of a condenser lens and a photo-electric converting device such as a photodiode corresponding to the photo-sensing areas A0 to A13 so as to serve as a multiply divisional photo-sensing system. The photo-sensing unit 180 senses the brightness of the object 2 and outputs brightness signals to the body controller 301 with respect to the photo-sensing areas A0 to A13.

The finder display device 124 displays the focusing situation whether the object 2 is focused or not, a shutter speed (or exposing time), an aperture value, a correction value of exposure, a result of flashing, and so on at a position below an imaging area in a view finder.

Figure 5:
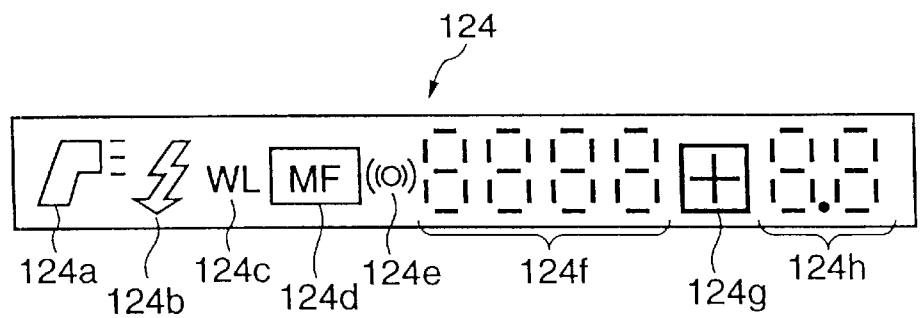
FIG. 5 is a schematic plan view for showing an example of a finder display device of the camera in accordance with the embodiment.

FIG. 5 shows an example of the display on the finder display device 124. The finder display device 124 serially shows a mark 124a for showing the use of the flash, a mark 124b for showing the completion of charge and flash light control of the flash apparatus 170 and/or 400, a mark 124c for showing the use of the exterior type flash apparatus 400 connected by the wireless connection, a mark 124d for showing the taking lens system 201 of the interchangeable lens 200 is manually focused, a mark 124e for showing the object 2 being focused, segments 124f for showing the shutter speed, an indication 124g for showing the direction of correction of the exposure or the flash light control, and segments 124h for showing the aperture value, degree of the correction of the exposure, or the correction of the flash light control from the left side to the right side.

Figure 6:
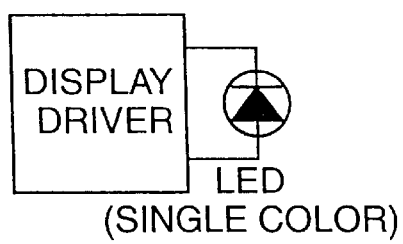
FIG. 6 is a schematic circuit diagram for showing an example of the above-mentioned finder display device in which the indication is illuminated by a monochromatic light.
Figure 7:
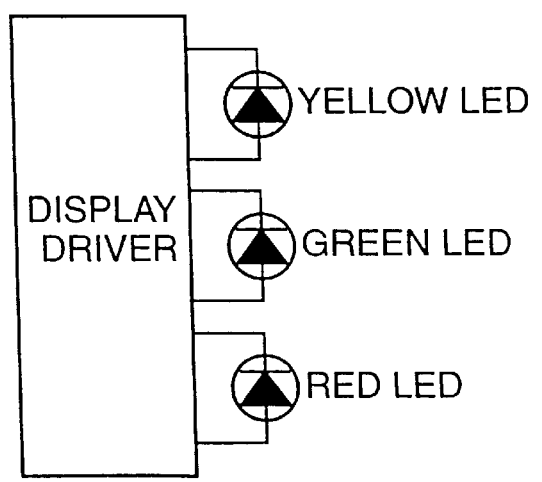
FIG. 7 is a schematic circuit diagram for showing another example of the above-mentioned finder display device in which the indication is illuminated by a plurality of color lights.

The finder display device 124 includes a plurality of light emitting devices such as light emitting diodes and liquid crystal display devices which are disposed corresponding to the positions of the above-mentioned marks and segments, and selectively drives the light emitting devices and the liquid crystal display devices for showing the information. In this embodiment, the body controller 301 can control the quantity of the flash light by several flash light control mode such as the conventional TTL flash light control and the improved TTL flash light control with an upper limit and/or a lower limit of the quantity by the criterion value in the flashmatic. Thus, it is necessary to distinguish the flash light control mode which will be or has been executed. The body controller 301 drives the finder display device 124 so as to vary the indication manner of the mark 124b showing the charge and flash light control of the flash apparatus 170 and/or 400. For example, when the color of the light emitting device cannot be varied (monochromatic) as shown in FIG. 6 in which a single light emitting device (LED) is connected to a display driver, the body controller 301 drives the display driver for varying the flashing period (flickering frequency) of the light emitting device corresponding to the flash light control mode. Alternatively, when the color of the light emitting device is changeable as shown in FIG. 7 in which a plurality of light emitting devices respectively emitting yellow, green and red colored light are connected to the display driver, the body controller 301 drives the display driver for changing the light emitting device to be driven corresponding to the flash light control mode.

Figure 8:
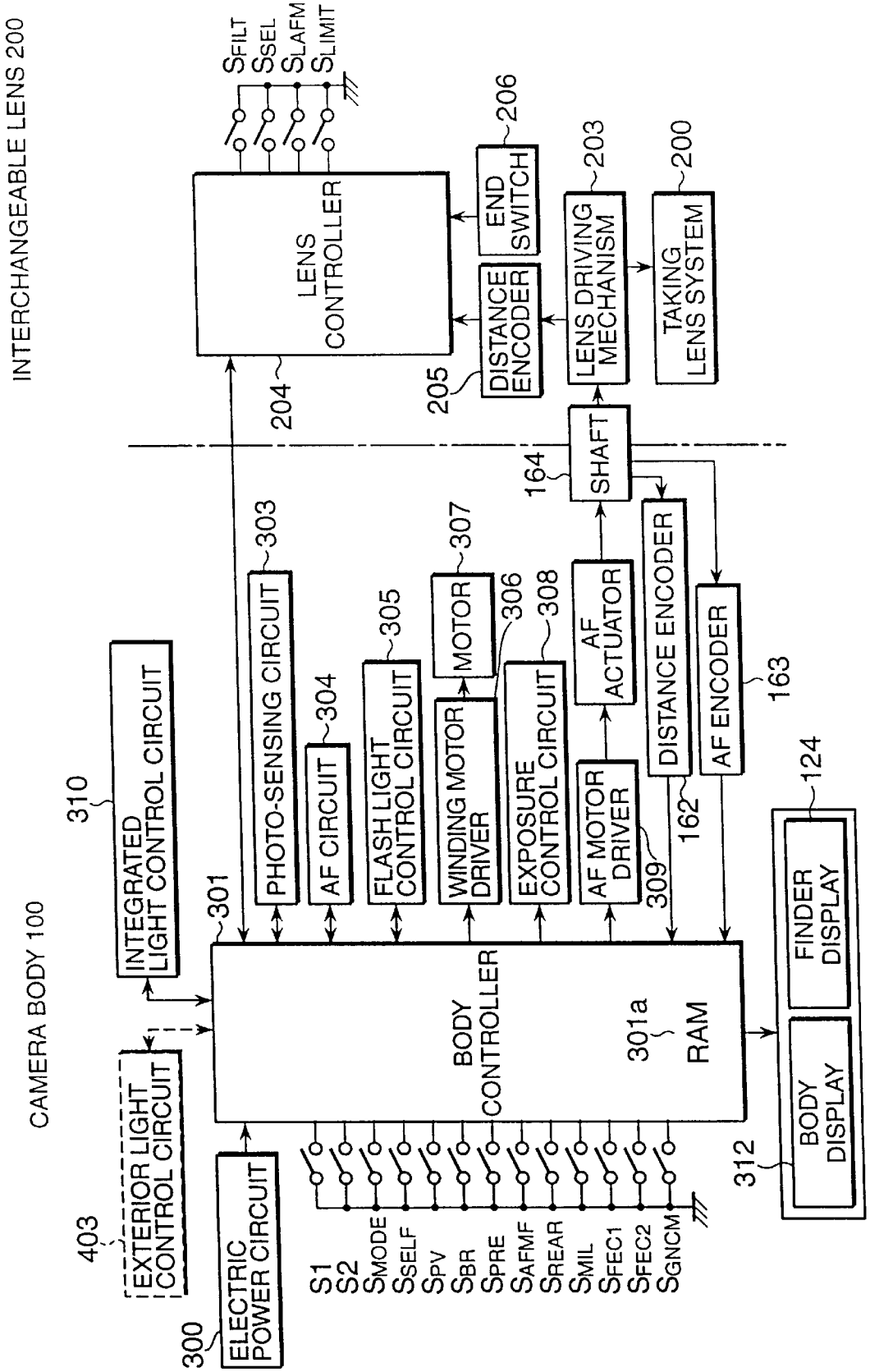
FIG. 8 is a block diagram for showing a configuration of a control system in the above-mentioned AF-SLR camera in accordance with the embodiment.

FIG. 8 shows a configuration of a control circuit of the above-mentioned SLR camera in this embodiment. The body controller 301 such as a CPU (Central Processing Unit) controls the operations of the camera for taking a photograph. An electric power circuit 300 is connected to the body controller 301 for supplying driving power to the driving circuits, motors, display devices, and so on in the camera body 100 and the interchangeable lens 200. A photo-sensing circuit 303 processes the output signal from the photo-sensing unit 180 for calculating the brightness of the object 2. An AF circuit 304 processes the output signal from the AF sensor unit 140 for calculating the direction and amount of movement of the AF actuator. A flash light control circuit 305 processes the output signal from the flash light sensor 150 for calculating the quantity of the flash light in the TTL flash light control. A winding motor driver 306 controls a motor 307 for winding the film 1. An exposure control circuit 308 calculates a shutter speed and an aperture value corresponding to the brightness of the object 2 by following a predetermined program and controls the shutter unit 130 and the aperture mechanism 207 by using the calculated shutter speed and the aperture value. An AF motor driver 309 controls the rotation angle or rotation quantity and the rotation direction of the AF actuator 161.

A body display device 312 is further provided on an outer surface of a housing of the camera body 100. Switches S1, S2, $S_{MODE}$, $S_{SELF}$, $S_{PV}$, $S_{REF}$, $S_{AFMF}$, $S_{REAR}$, $S_{MIL}$, $S_{FEC1}$, $S_{FEC2}$, $S_{GNCM}$, and so on are connected to the body controller 301.

Figure 9:
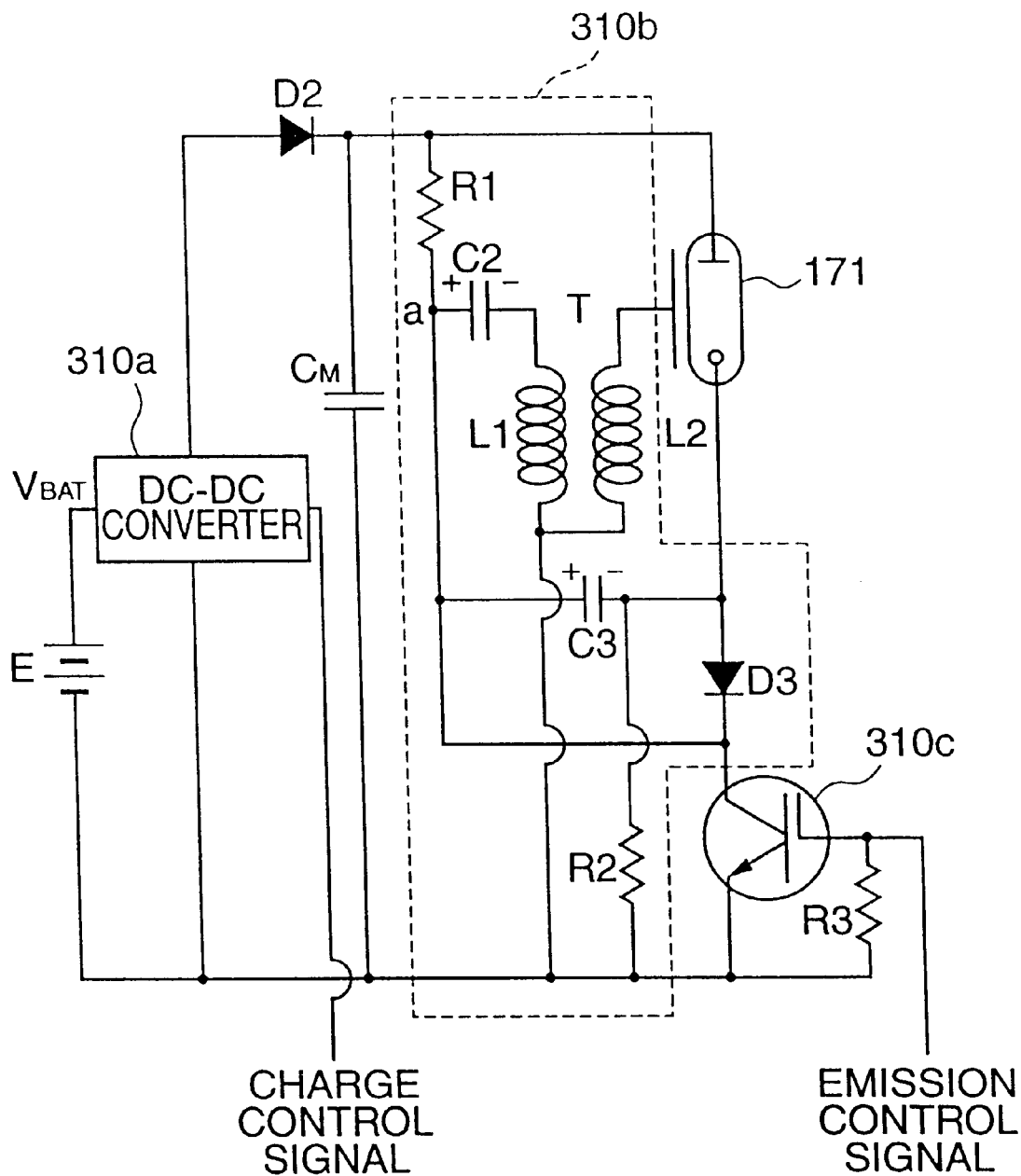
FIG. 9 is a circuit diagram for showing an example of a configuration of a flash light control circuit of the camera in accordance with the embodiment.

FIG. 9 shows an example of a circuit diagram of the light emission control circuit 310 of the built-in flash apparatus 170. The light emission control circuit 401 of the exterior type flash apparatus 400 has substantially the same configuration.

The light emission control circuit 310 is configured by a DC—DC converter 310a for increasing a voltage $V_{BAT}$ of a battery E mounted on the camera body 100 to a high voltage having a predetermined level, a diode D2 for rectifying the output voltage from the converter 310a, a main capacitor $C_M$ for charging electric energy which is to be discharged by the flashing tube 171, a trigger circuit 310b for outputting a trigger voltage to the flashing tube 171, and a switching element 310c such as IGBT (Insulated Gate Bipolar mode Transistor) for controlling the emission of the flash light from the flashing tube 171 corresponding to emission control signals consists of emission start signal and emission stop signal from the body controller 301.

The battery E is connected in parallel with input terminals of the DC—DC converter 310a. The main capacitor $C_M$ is connected in parallel with output terminals of the DC—DC converter 310a via the diode D2. A series circuit of the flashing tube 171, a diode D3 and the switching element 310c is connected in parallel with the main capacitor $C_M$.

The trigger circuit 310b is mainly configured by a voltage increasing transformer T. An end of a primary winding L1 of the transformer T is connected to a positive terminal of the main capacitor $C_M$ via a resistor R1 and a capacitor C2. An end of a secondary winding L2 of the transformer T is connected to a trigger terminal of the flashing tube 171. The other ends of the primary winding L1 and the secondary winding L2 of the transformer T are respectively connected to a negative terminal of the main capacitor $C_M$ which serves as a grounding line. A connection point "a" of the resistor R1 and the capacitor C2 is connected to a cathode of the diode D3, and further connected to an anode of the diode D3 via a capacitor C3. A resistor R2 is connected between the anode of the diode D3 and the grounding line.

The DC—DC converter 310a is driven by a charge control signal from the body controller 310, so that the charge of the main capacitor $C_M$ is controlled. When the DC—DC converter 310a is driven by the charge control signal, the increased voltage having a voltage of several hundred V, for example, 300 V to 400 V is outputted from the DC—DC converter 310a. The main capacitor $C_M$ is charged by the increased voltage. Simultaneously, the capacitor R2 is charged to a predetermined polarity by a voltage supplied through the resistor R2, and the capacitor C3 is charged to a predetermined polarity by a voltage supplied through the resistors R1 and R2.

After charging the main capacitor $C_M$, when the emission control (or start) signal having a high voltage is inputted to the switching element 310c, the switching element 310c is switched on and a series circuit of the flashing tube 171 and the diode D3 is equivalently connected to the main capacitor $C_M$, so that a discharging circuit of the main capacitor $C_M$ is configured. Simultaneously, positive terminals of the capacitors C2 and C3 are connected to the grounding line via the switching element 310c, so that the charge in the capacitor C2 flows to the grounding line through the switching element 310c. Thus, a high voltage such as several kV induced in the secondary winding L2 of the transformer T is applied to the flashing tube 171 as the trigger voltage. On the other hand, a summation of the voltage of the main capacitor $C_M$ and the voltage of the capacitor C3 which is about double of the voltage of the main capacitor $C_M$ is applied to the flashing tube 171. As a result, the electric charge in the main capacitor $C_M$ is discharged by the series circuit of the flashing tube 171, the diode D3 and the switching element 310c so as to emitting the flash light from the flashing tube 171.

After starting the discharge of the electric charge in the main capacitor $C_M$, when the emission control (or stop) signal having a low voltage is inputted to the switching element 310c, the switching element 310c is switched off and the discharging circuit of the flashing tube 171 is shut off so that the emission of the flash light is stopped. Thus, it is possible to control the quantity of the flash light emitted from the flashing tube 171 can be controlled by controlling a period while the switching element 310c has been switched on.

The switch S1 shown in FIG. 8 will be switched on when the user touches a shutter release button of the camera body 100 or pushes down the shutter release button to the midway. When the switch S1 is switched on, the body controller 301 starts to drive the photo-sensing circuit 303 and the AF circuit 304 so as to prepare to take a photograph. Furthermore, the body controller 301 starts to drive the AF motor driver 309 for focusing the taking lens system 201 of the interchangeable lens 200.

The switch S2 will be switched on when the shutter release button is fully pushed down. When the switch S2 is switched on, the body controller 301 drives the photo-sensing circuit 303 and the AF circuit 304 for deciding photographing conditions, for focusing the interchangeable lens 200 and for driving the shutter unit 130 and the aperture mechanism 207 so as to expose the film 1.

The switch $S_{MODE}$ is a photographing mode selection switch used for selecting an automatic exposing mode such as a program mode, a shutter speed priority mode and an aperture value priority mode.

The switch $S_{SELF}$ is a self timer switch for selecting a self timer mode photographing in which the shutter unit 130 is driven after passing a predetermined time period from a time when the user pushed down the shutter release button.

The switch $S_{PV}$ is a preview switch for selecting a preview mode. When the preview mode is selected, the aperture mechanism 207 is actually driven for taking an aperture value which will be used for taking a photograph, so that the user can confirm the brightness and the depth of field of the taken image through the viewfinder 120. On the contrary, when the preview mode is not selected, the aperture mechanism 207 is not driven for maintaining the open aperture value of the taking lens system 201, so that the brightness of the object 2 viewed through the viewfinder is the highest.

The switch $S_{BR}$ is a bracket switch for selecting a bracket mode photographing in which a plurality of photographs are taken under different exposure control values when the user pushes down the shutter release button only once.

The switch $S_{PRE}$ is a pre-flash switch for selecting a pre-flash mode in which the flash apparatus 170 or 400 emits a flash light prior to the photographing for confirming a quantity of flash light reflected by the object 2. The quantity of the flash light sensed by the photo sensing unit 180 in the pre-flash mode is used for calculating an equivalent distance to the object 2 under an assumption that the object 2 has a standard reflectance such as 18%. The equivalent distance to the object 2 will be compared with the distance to the object 2 sensed by the distance encoder 205 or the AF encoder 163. In other words, the reflectance of the object 2 can be calculated, when the equivalent distance to the object 2 is different from the actual distance to the object 2.

Figure 10:
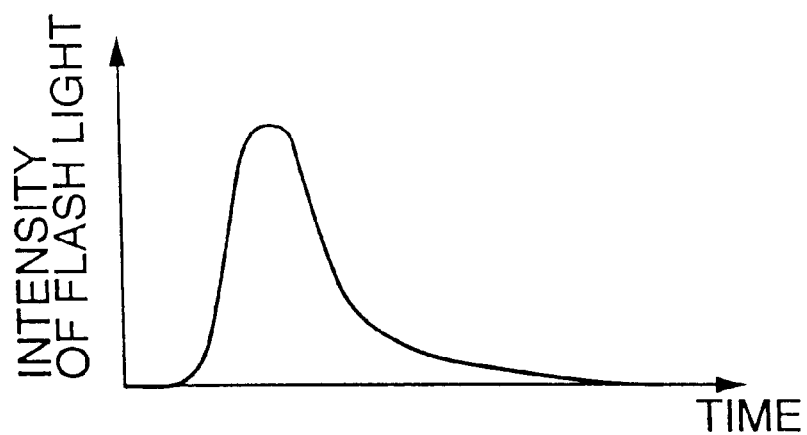
FIG. 10 is a graph for showing a waveform of intensity of flash light for illuminating an object while a film has been exposed.
Figure 11:
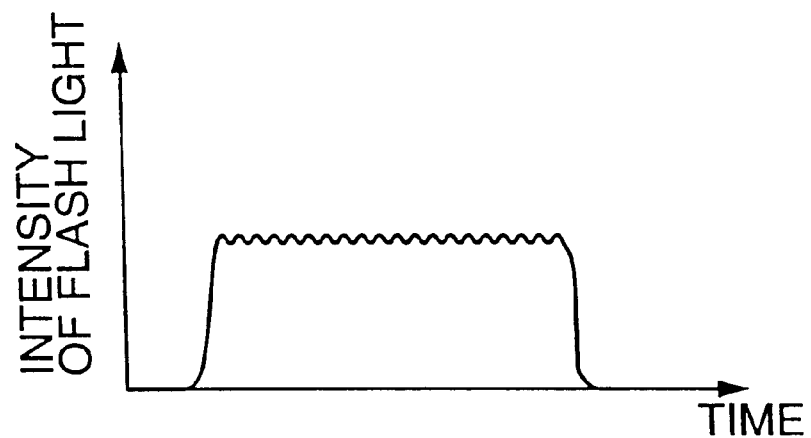
FIG. 11 is a graph for showing a waveform of intensity of pre-flash light for sensing information with respect to the object.

In the actual flash lighting for taking a photograph, the flash light has a characteristic having a peak with respect to the intensity thereof, as shown in FIG. 10. On the other hand, the flash light in the pre-flash mode has a characteristic having a flat top portion with respect to the intensity thereof, as shown in FIG. 11. In the pre-flash mode, the flash light is sensed by the photo-sensing unit 180, so that the characteristic of the flash light is made to be flat for increasing the accuracy of the sensing of the flash light. It, however, is possible to sense the flash light by the flash light sensor 150 in the pre-flash mode.

The switch $S_{AFMF}$ is a focusing mode selection switch for selecting alternative of the automatic focusing mode (AF mode) in which the focus of the taking lens system 201 of the interchangeable lens 200 is automatically controlled by the AF actuator 160 and the manual focusing mode (MF mode) in which the focus of the taking lens system 201 is manually controlled by the user.

The switch $S_{REAR}$ is a synchronizing timing switch for selecting a timing for emitting the flash light responding to the movement of the front shutter blade or the rear shutter blade of the shutter unit 130. When the synchronizing timing switch $S_{REAR}$ is switched off, the flash light will be emitted when the front shutter blade is completely opened. Alternatively, when the synchronizing timing switch $S_{REAR}$ is switched on, the flash light will be emitted by a predetermined time before the rear shutter blade starts to close.

The switch $S_{MIL}$ is a mirror-up mode switch for selecting the mirror-up mode photographing in which the movement of the shutter unit 130 is delayed a predetermined time such as two second after moving up the mirrors 111 and 112 so as not to be affected by the vibration due to the mirror-up motion while the film 1 has been exposed. When the mirror-up mode switch $S_{MIL}$ is switched off, the shutter unit 130 will be driven as soon as possible after moving up the mirrors 111 and 112 for shortening the delay time between the start of the exposure and the switching on of the switch S2.

The switches $S_{FEC1}$ and $S_{FEC2}$ are respectively flash light control mode switches for selecting one of a criterion value restriction TTL flash light control mode (restriction mode), a multiply divisional TTL flash light control mode (multi mode) and an averaged TTL flash light control mode (average mode). For selecting the automatic flash light control mode, an operation member (not shown in the figure) on the camera body 100 is operated. When the operation member is operated, the indication on the body display 312 with respect to the automatic flash light control mode is serially changed in a predetermined order of these tree modes corresponding to the number of the operation of the operation member. The selection of the automatic flash light control mode is converted to on and off of the flash light control mode switches $S_{FEC1}$ and $S_{FEC2}$. The restriction mode, the multi mode and the average mode are respectively inputted into the body controller 301 as (0,0), (1,0) and (0,1). The body controller 301 can judge the flash light control mode selected by the user from on and off of the flash light control mode switches $S_{FEC1}$ and $S_{FEC2}$.

The switch $S_{GNCM}$ is a compensation switch for compensating the upper limit and/or the lower limit by the criterion value in the restriction mode. When the compensation switch $S_{GNCM}$ is switched on, the value of the upper limit is increased and/or the value of the lower limit is reduced. Alternatively, when the compensation switch $S_{GNCM}$ is switched off, the upper limit and/or the lower limit are/is released.

Switches $S_{FILT}$, $S_{SEL}$, $S_{LAFMF}$, $S_{LIMIT}$, and so on are connected to the lens controller 204. The switch $S_{FILT}$ is a filter detection switch for detecting whether any optical filter is inserted into the taking lens system 201 or not when the interchangeable lens 200 can detect the attachment of an interchangeable optical filter such as a color balancing filter, a soft focusing attachment or an attachment for adding special effect such as a cross shaped light beam.

The switch $S_{SEL}$ is a specific optical system detection switch for detecting whether the interchangeable lens 200 has a specific optical lens system such as a tilt mechanism or a shift mechanism by which the focusing conditions in the vicinity of the center of the image field and the vicinity of the outer periphery of the image field are different.

The switch $S_{LAFMF}$ is an AF/MF detection switch for detecting whether the interchangeable lens 200 can be selected to be focused by an automatic control or manual operation. The switch $S_{LIMIT}$ is a range limit detection switch for detecting whether a movable range of the taking lens system 201 of the interchangeable lens 200 is restricted or not. For example, when the taking lens system 201 is a zoom lens with close-up function, a region of focal length of the taking lens system in which the close-up function is effective is sometimes restricted. The results of the detection by these switches are inputted to the lens controller 204.

Subsequently, an automatic flash light control in the above-mentioned AF-SLR camera will be described with reference to flowcharts.

Figure 12:
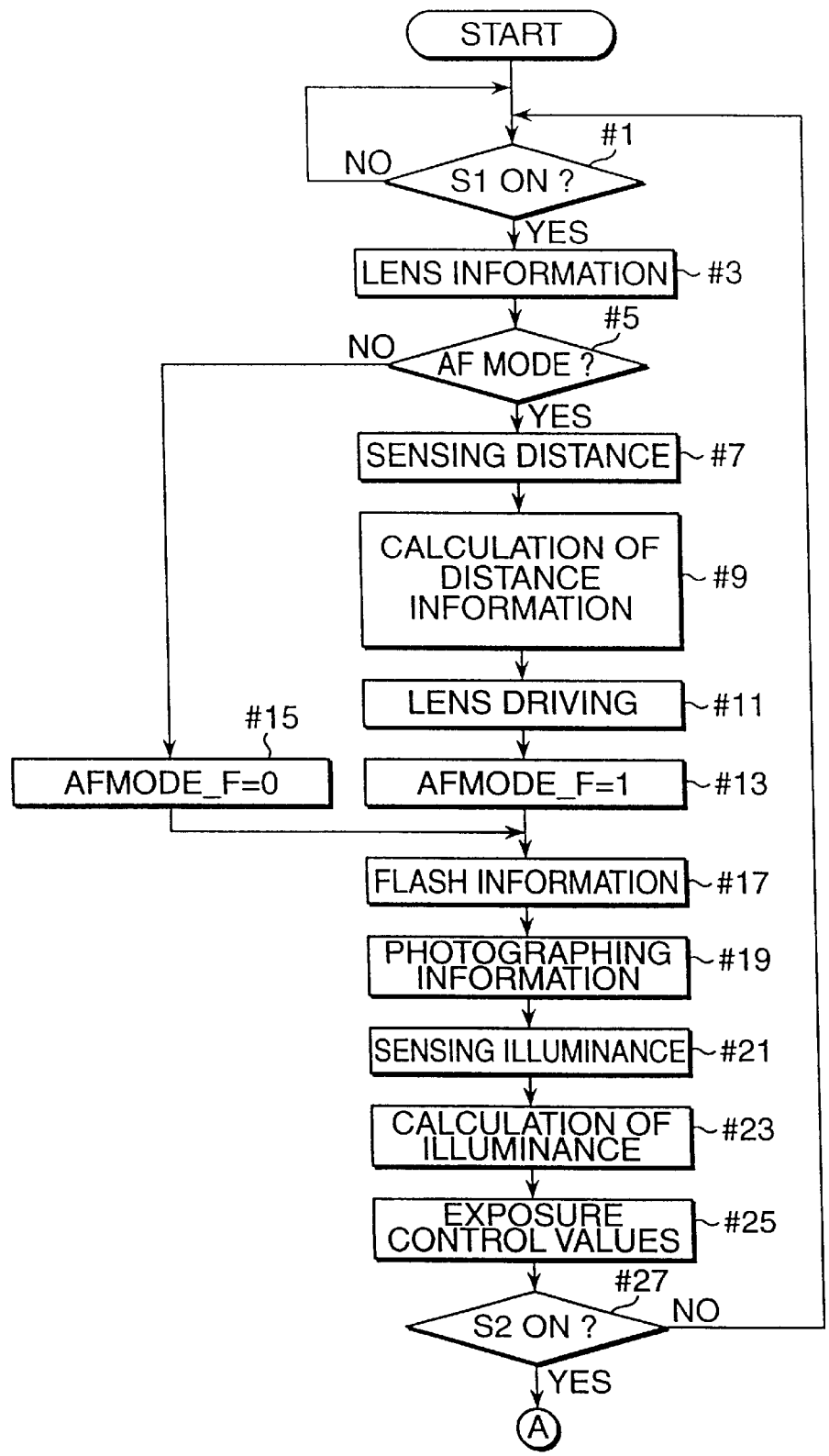
FIG. 12 is a flowchart for showing processes when a shutter release button is pushed down to midway in the camera in accordance with the embodiment.
Figure 13:
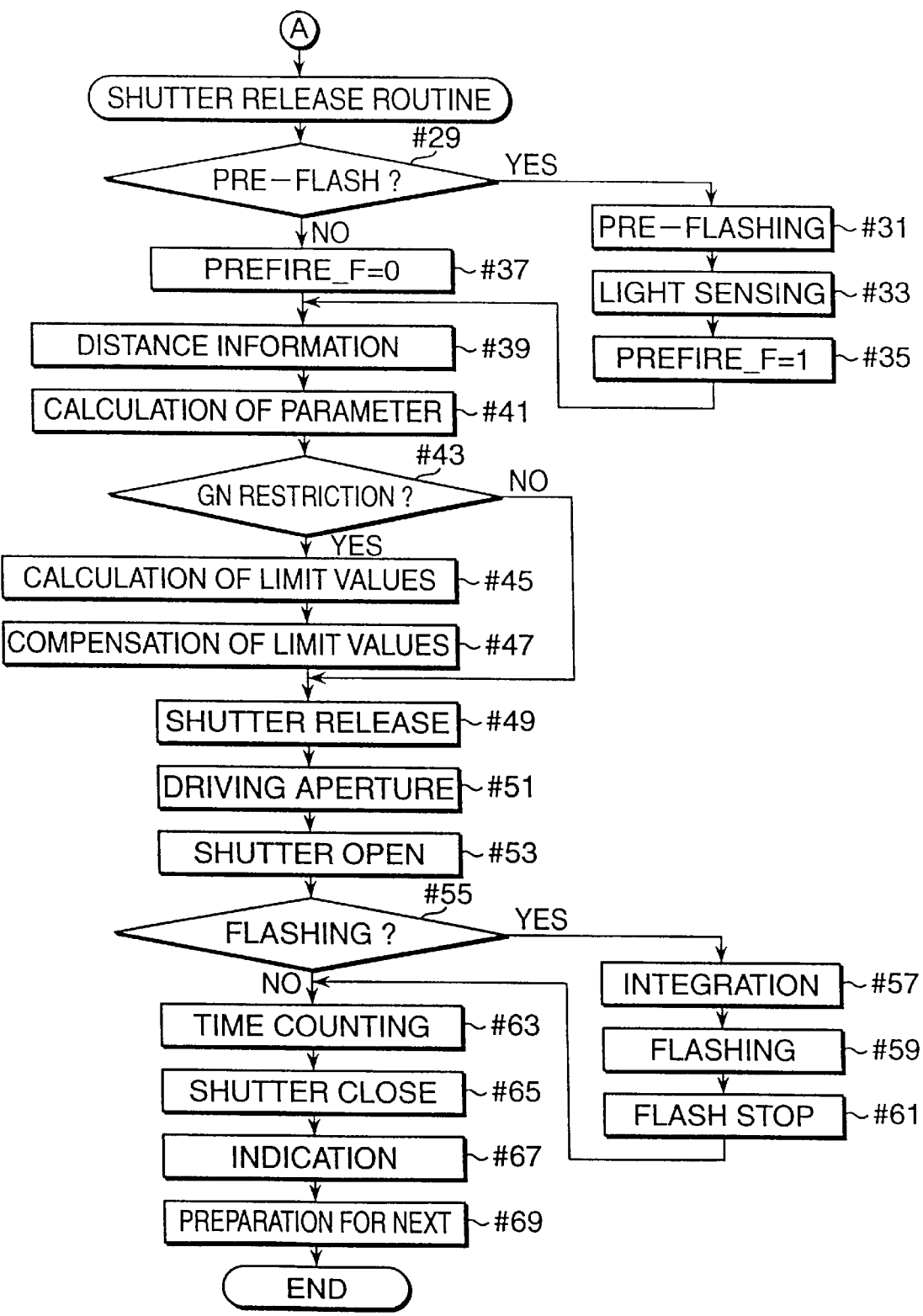
FIG. 13 is a flowchart for showing processes when the shutter release button is fully pushed down in the camera in accordance with the embodiment.

FIGS. 12 and 13 show the flowchart when the shutter release button is fully pushed down. When a power switch of the camera body 100 is switched on, the body controller 301 initializes the setting of the camera body 100 and the interchangeable lens 200, and it waits the switch S1 switched on (Step #1). When the shutter release button is pushed down to the midway, the switch S1 is switched on (YES in Step #1). The data is communicated between the body controller 301 and the lens controller 204, and the specific lens information with respect to the taking lens system 201 of the interchangeable lens 200 is transmitted to the body controller 301 (Step #3).

The lens information relates to the accuracy of the automatic focusing, the possibility of the automatic focusing, the aperture information, the distance information to the object, the accuracy of the detection of the distance to the object, the focal length information, the filter information (on or off of the switch $S_{FILT}$), the specific optical system information (on or off of the switch $S_{SEL}$), the selection of the automatic focusing or the manual focusing (on or off of the switch $S_{LAFMF}$), the setting of the range limit (on or of the switch $S_{LIMIT}$), and so on, which will affect the accuracy for calculating the criterion value in the automatic flash light control.

The information of the accuracy of the automatic focusing is concretely information of the depth of field corresponding to the aperture value. Since the depth of field will be varied corresponding to the variations of the aperture value and the focal length of the taking lens, it will affect the accuracy of the automatic focusing.

The information of the possibility of the automatic focusing is concretely information whether the interchangeable lens 200 mounted on the camera body 100 is a manual focusing lens or not. Some manual focusing lens has a CPU and an encoder. When such the manual focusing lens is mounted on the AF-SLR camera, the TTL automatic flash light control can be executed. Since the accuracy of the manual focusing will be lower than that of the automatic focusing, it will affect the accuracy for sensing the distance to the object.

The aperture information is concretely information whether the aperture mechanism 207 of the interchangeable lens 200 is movable or not. When the aperture mechanism 207 is movable, the information contains the variable range of the aperture value of the interchangeable lens 200. For example, when the interchangeable lens 200 is a reflex telephoto lens, the aperture thereof is immovable.

The distance information to the object is concretely the distance to the object 2 from the camera body 100 calculated by the lens controller 204 in the interchangeable lens 200. Since the distance to the object 2 is converted from the position of the taking lens system 201, the distance information is equivalent to the position of the taking lens system 201 sensed by the distance encoder 205.

The accuracy of the detection of the distance to the object is concretely information with respect to the accuracy for sensing the position of the taking lens system 201 by the distance encoder 205. In other words, it is an error component included in an detection value of the distance encoder 205.

The focal length information is concretely information of the focal lengths of the taking lens system 201. When the focal length of the taking lens system 201 is not variable, the focal length information is constant. Alternatively, when the focal length of the taking lens system 201 is variable such as a zoom lens, the focal length information includes the longest and the shortest focal lengths and the current focal length.

The filter information is information for showing whether any optical filter is inserted in the taking lens system 201 or not. The specific optical system information is information for showing whether the taking lens system 201 is specific or not. The selection of the automatic focusing or the manual focusing is information for showing whether the user selects the automatic focusing or the manual focusing when the taking lens system 201 of the interchangeable lens 200 can be controlled by both of the automatic focusing system and the manual focusing operation by the user.

When the lens information is transmitted to the body controller 301, the body controller 301 judges whether the automatic focusing mode is selected or not with reference to the switch $S_{AFMF}$ (Step #5). When the automatic focusing mode is selected (YES in Step #5), the body controller 301 drives the AF sensor unit 140 for sensing the focus condition of the taking lens system 201 by using a plurality of sensors (Step #7). The defocus quantities which correspond to driving control direction and amount for moving the taking lens system 201 from the current position to the infocus position are calculated by using the result of the sensing of the focus condition from the AF sensor unit 140. Simultaneously, the information whether the object is focused or not, the information of the accuracy of the automatic focusing and the distance to the object are calculated by using the defocus quantities (Step #9).

Subsequently, the body controller 301 starts to drive the lens driving mechanism 203 for moving the taking lens system 201 corresponding to the results of the calculation (Step #11). A flag "AFMODE F" is set to be "1" for showing the automatic focusing mode is selected (Step #13). Alternatively, when the automatic focusing mode is not selected (NO in Step #5), the above-mentioned operations are not executed, and the flag "AFMODE F" is reset to be "0" (Step #15).

Subsequently, the flash information is taken into the body controller 301 (Step #17). The flash information relates to parameters which will cause the error component in the flashmatic. The flash information including, for example, the information which of the exterior type flash apparatus 400 and the built-in flash apparatus 170 will be used, the information whether the wide panel for varying the illuminating angle of the flash is mounted on the flash apparatus or not, the information whether the flash light directly illuminates the object or not (bounding flash or not), the information whether the flash apparatus is departed from the camera body or not, the information whether the flash apparatus is connected wired or wireless, the information of the number of the exterior type flash apparatuses connected to the camera body, and the maximum and the minimum quantities of the flash light (the largest and the smallest values of the criterion value of the flash light), and so on.

Subsequently, the photographing information which will affect the flash lighting is inputted to the body controller 301 (Step #19). The photographing information includes the selection of the flash light control mode among the criterion value restriction TTL flash light control, the multiply divisional TTL flash light control and the averaged overall TTL flash light control, the information for showing whether any of the criterion value control compensation mode, the rear shutter blade synchronizing mode, the mirror-up mode, the self timer mode and the bracket mode is selected or not, and the information whether the automatic focusing is selected or the manual focusing is selected. Such the information can be judged corresponding to the signals from the switches $S_{FEC1}$, $S_{FEC2}$, $S_{GNCM}$, $S_{REAR}$, $S_{MIL}$, $S_{SELF}$, $S_{BR}$ and $S_{AFMF}$.

Subsequently, the brightness of the object 2 is sensed by the multiply divided sensors of the photo sensing unit 180 (Step #21), and the luminance value BVave of the object 2 and the luminance values BVc0 to BVc3 corresponding to the flash light sensing areas C0 to C3 are calculated by using the results of the brightness sensing (Step #23). In the calculation process, the luminance values BVa0 to BVa13 sensed with respect to the photo-sensing areas A0 to A13 (see FIG. 4) by the photo sensing unit 180 are memorized in the RAM 301a in the body controller 301. The luminance value BVave of the object is calculated by averaging the luminance values BVa0 to BVa13 by the following equation (1).

$$BVave = \frac{\sum_{n=1}^{13} BVan}{13} \qquad (1)$$

Figure 14:
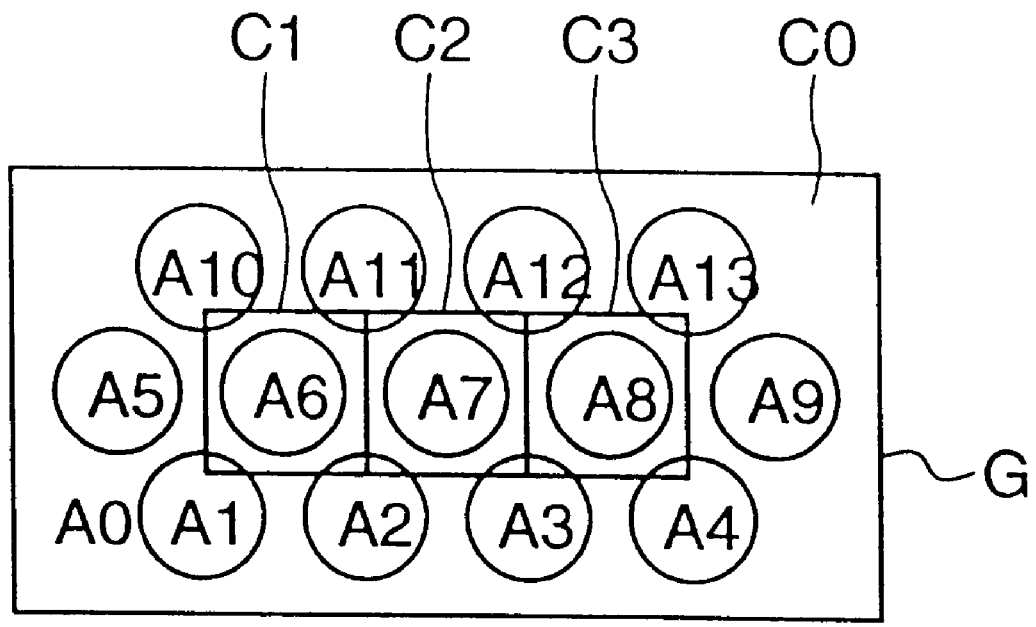
FIG. 14 is a schematic plan view for showing a relation between the flash light sensing areas in the flash light sensor and the photo-sensing areas of the photo sensing unit of the camera in accordance with the embodiment.

As can be seen from FIG. 14 which shows the relation between the photo-sensing areas A0 to A13 and the flash light sensing areas C0 to C3, the photo-sensing areas A6, A7 and A8 overlap the flash light sensing areas C1, C2 and C3, and the photo-sensing areas A1 to A5 and A9 to A13 overlap the flash light sensing area C0. The sensed luminance values BVa6, BVa7 and BVa8 of the photo-sensing areas A6, A7 and A8 are directly applied to the luminance values BVc1, BVc2 and BVc3 corresponding to the flash light sensing areas C1, C2 and C3. That is, BVc1=BVa6, BVc2=BVa7 and BVc3=BVa8. The averaged value of the sensed luminance values BVa1 to BVa5 and BVa9 to BVa13 of the photo-sensing areas A1 to A5 and A9 to A13 is applied to the luminance value BVc0 corresponding to the flash light sensing area C0. The luminance value BVc0 is calculated by the following equation (2).

$$BVc0 = \log_2 \frac{\left(\sum_{n=1}^{5} 2^{BVan} + \sum_{m=9}^{13} 2^{BVam}\right)}{10} \qquad (2)$$

When the luminance values of the object are calculated, the exposure control values such as the shutter speed and the aperture value are calculated (Step #25). When a nominal film sensitivity is shown by SV, the exposure value EV is calculated by the luminance value BV of the object and the film sensitivity SV (EV=BV+SV). When the exposure value EV is calculated, the shutter speed (TV) and the aperture value (AV) are automatically fixed by following the predetermined program line.

Subsequently, the body controller 301 judges whether the shutter release button is fully pushed down or not, in other words whether the switch S2 is switched on or not (Step #27). When the shutter release button is not fully pushed down (NO in Step #27), the body controller 301 returns to the step #1 for waiting the next operation. Alternatively, when the shutter release button is fully pushed down (YES in Step #27), the body controller 301 proceeds to shutter release routine below the step #29.

When the body controller 301 proceeds to the shutter release routine, the body controller 301 judges whether the pre-flash mode is selected or not (Step #29). When the pre-flash mode is selected (YES in Step #29), the flash apparatus 170 or 400 previously emits the flash light having the flat characteristic (pre-flashing) (Step #31), and the quantity of light reflected by the object 2 is sensed by the photo-sensing unit 180 (Step #33). A flag "PREFIRE F" showing the flash light is previously emitted is set to be "1" (Step #35). Alternatively, when the pre-flash mode is not selected (NO in Step #29), the flash apparatus 170 or 400 emits no flash light, and the flag "PREFIRE F" is reset to be "0" (Step #37).

Figure 15:
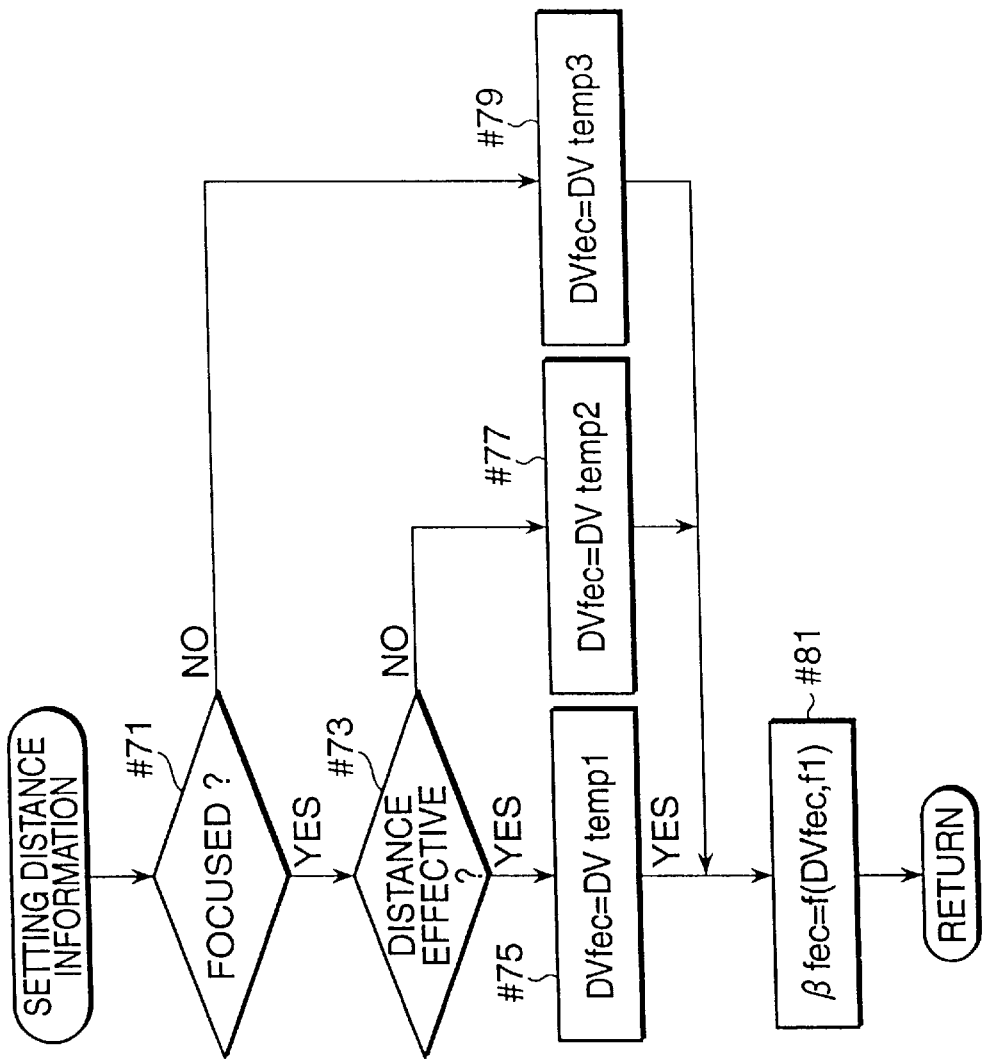
FIG. 15 is a flowchart for showing process for setting distance information to the object in accordance with the embodiment.

Subsequently, the distance information to the object is set by following the flowchart shown in FIG. 15 (Step #39). At first, the body controller 301 judges whether the result of the calculation in the step #9 shows the taking lens system 201 is in the infocus condition or not (Step #71). When the taking lens system 201 is in infocus condition (YES in Step #71), the body controller 301 further judges whether the distance information to the object 2 sensed in the interchangeable lens 200 is effective or not corresponding to the accuracy of the automatic focusing, in other words whether the sensing accuracy of the distance encoder 205 is effective or not (Step #73). When the distance information is effective (YES in Step #73), a distance DVtemp1 inputted from the interchangeable lens 200 is selected as the distance to the object DVfec which is to be used for calculating the upper limit and the lower limit of the quantity of the flash light when the quantity of the flash light is restricted by the criterion value in the TTL flash light control (Step #75). Alternatively, when the distance information is ineffective (NO in Step #73), a distance DVtemp2 sensed by the distance encoder 162 in the camera body 100 is selected as the distance to the object DVfec (Step #77). When the taking lens system 201 is not in infocus condition (NO in Step #71), a distance DVtemp3 sensed by the AF encoder 163 in the camera body 100 is selected as the distance to the object DVfec (Step #79).

When the taking lens system 201 is in infocus condition and the accuracy of the position information of the taking lens system 201 is sufficiently higher, the distance DVtemp1 calculated from the position information of the taking lens system 201 is the most reliable value, so that it is used as the distance to the object DVfec used for calculating the quantity of the flash light in the flashmatic light control. When the taking lens system 201 is in infocus condition but the accuracy of the position information of the taking lens system 201 is not so higher, it is considered that the accuracy of the distance DVtemp2 sensed by the distance encoder 162 in the camera body 100 is higher than that of the distance DVtemp1 sensed by the distance encoder 205 in the interchangeable lens 200, so that the distance DVtemp2 is used as the distance to the object DVfec. When the taking lens system 201 is not in infocus condition, it is impossible to calculate the distance to the object 2 from the position information of the taking lens 201, so that the distance DVtemp3 which is an estimated value including the defocus quantity calculated in the automatic focusing operation is used as the distance to the object DVfec.

Subsequently, the body controller 301 calculates an image magnification $\beta_{fec}$ by using the distance to the object DVfec and the focal length F1 of the taking lens system 201 inputted in the step #3 (Step #81). Generally, when the distance to an image from the principal point of the taking lens system 201 is designated by a symbol "s" and the distance to the object is designated by a symbol "s", the image magnification $\beta$ is shown as s'/s. Since the distance s'=(1+$\beta$) and the focal length of the interchangeable lens 200 is F, so that $\beta$=(1+$\beta$)·F/s, and $\beta$=F/(s−F). Thus, the image magnification $\beta_{fec}$ can be calculated as $\beta_{fec}$=F1/(DVfec−F1) or $\beta_{fec} \approx$ F1/DV$_{fec}$.

Figure 16:
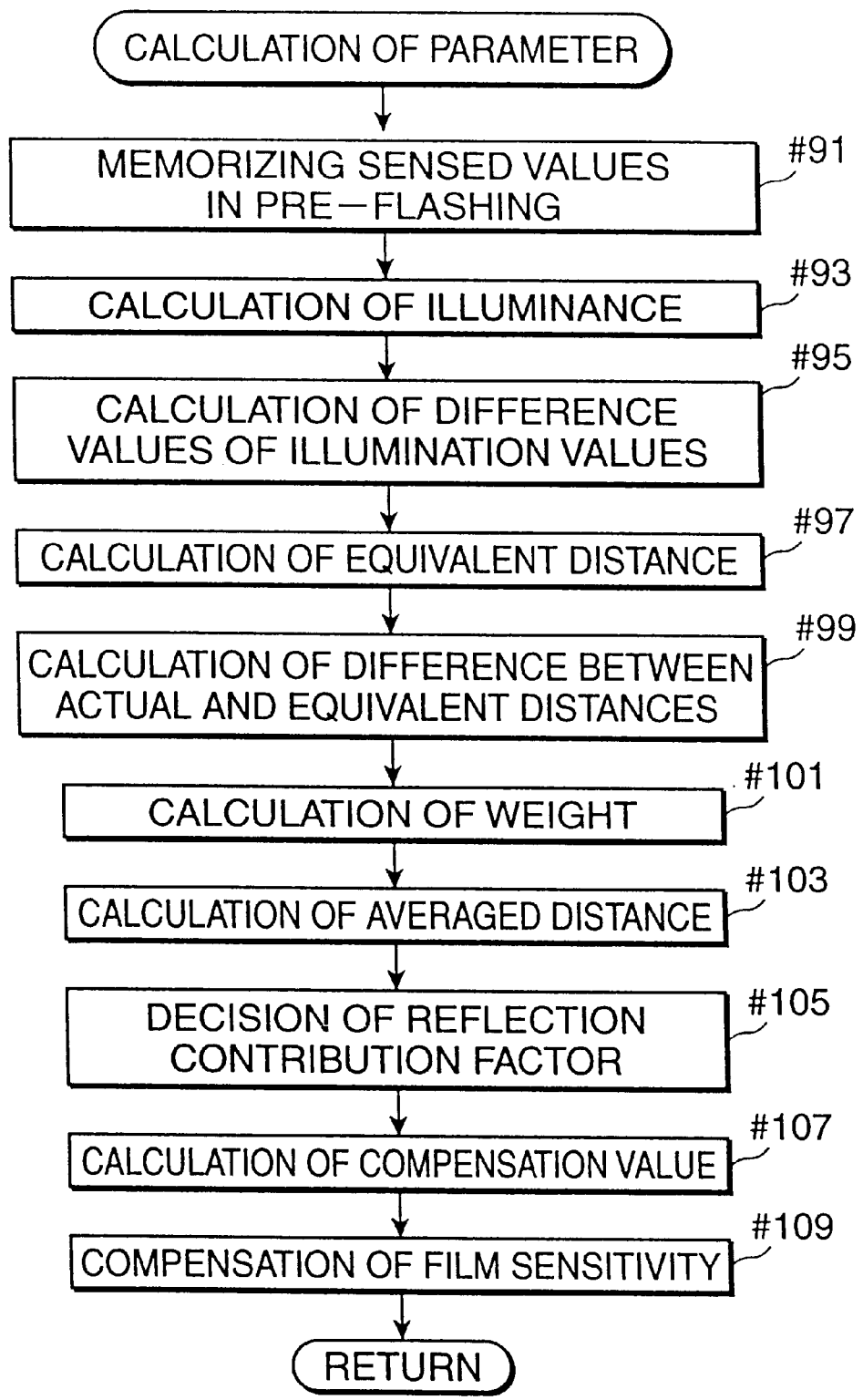
FIG. 16 is a flowchart for showing calculation process of a parameter used for controlling a quantity of a flash light in accordance with the embodiment.

When the distance information with respect to the object is processed, the body controller 301 calculates a parameter used for flash light control such as a compensated film sensitivity SVC by following the flowchart shown in FIG. 16 (Step #41).

In the calculation process of the parameter, similar to the multiply divisional photo-sensing process in the step #23, the luminance values BVF0 to BVF3 corresponding to the flash light sensing areas C0 to C3 are calculated by using the sensed values BVpre0 to BVpre13 corresponding to the photo-sensing areas A0 to a13 by the photo-sensing unit 180 in the previous flash lighting (Steps #91 and #93). That is, the values BVpre6, BVpre7 and BVpre8 are used as the luminance values BVF1, BVF2 and BVF3 corresponding to the flash light sensing areas C1 to C3. The luminance value BVF0 corresponding to the flash light sensing area C0 is calculated by the following equation (3).

$$BVF0 = \log_2 \frac{\left(\sum_{n=1}^{5} 2^{BVpren} + \sum_{m=9}^{13} 2^{BVprem}\right)}{10} \Lambda \quad (3)$$

Subsequently, the difference values ΔBVF0, ΔBVF1, ΔBVF2 and ΔBVF3 between the luminance values BVF0 to BVF3 when the object 2 is illuminated by the pre-flash light and the luminance values BVc0 to BVc3 when the object 2 is illuminated by the available light are calculated by the following equation (4) (Step #95).

$$\Delta BVFn = \max(K, BVFn - BVcn) \quad (4)$$

n=0, 1, 2, 3

In the equation (4), the symbol "K" designates a positive lower limit when the difference value between the luminance values is abnormal, for example, the difference value becomes negative. It will be set as K=0.125 EV, for example.

Subsequently, the equivalent distance to the object DVFn is calculated by following the equation (5) with using the luminosity LVtest of the pre-flash light, the luminance value of the object BVcn when the object 2 is illuminated by the available light and the difference value ΔBVn between the luminance values of the object illuminated by the pre-flash light and the available light (Step #97).

$$DVFn = LVtest - BVcn - \log_2(2^{\Delta BVFn} - 1) \quad (5)$$

n=0, 1, 2, 3

Subsequently, a difference ΔDVFn between the equivalent distance to the object DVFn and the distance to the object DVfec calculated in the step #39 is calculated by the following equation (6) (Step #99), and an weight WTFn used in the multiple flash light sensing is calculated by the following equation (7) by using the difference ΔDVFn (Step #101).

$$\Delta DVFn = DVFn - DVfec \quad (6)$$

$$WTFn = \min(K2, \max(K1, (C1 \cdot |\Delta DVFn| + C2))) \quad (7)$$

n=0, 1, 2, 3

C1: negative factor (for example, C1=−40)
C2: positive factor (for example, C2=80)
K1, K2: constant values (for example, K1=1, K2=64)

Figure 17:
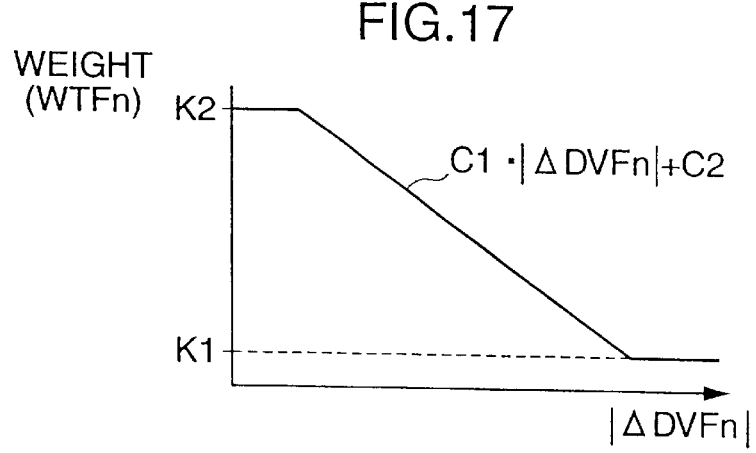
FIG. 17 is a graph for showing a characteristic for setting a weight used for controlling the quantity of the flash light in accordance with the embodiment.

The equation (7) shows that the weight WTFn is decided by following a function (C1·|ΔDVFn|+C2) between K1 and K2 (1 to 64) as shown in FIG. 17.

The averaged value ΔDVave of the difference between the distances with considering the reflectance of the object 2 is calculated by the following equation (8) (Step #103).

$$\Delta DVave = \frac{\sum_{n=0}^{3} (\Delta DVFn \cdot WTFn)}{\sum_{n=0}^{3} WTFn} \Lambda \quad (8)$$

The reflection contribution factor $\eta_{ref}$ is selected from the following table 1 with reference to the image magnification $\beta_{ref}$ calculated in the step #39 and the focal length F1 of the taking lens system 201 (Step #105).

TABLE 1

| | βfec | | | |
|---|---|---|---|---|
| F1(mm) | ~1/40 | 1/40~1/60 | 1/60~1/80 | 1/80~ |
| ~35 | 0.2 | 0.2 | 0.1 | 0.0 |
| 35~50 | 0.4 | 0.2 | 0.1 | 0.0 |
| 50~100 | 0.7 | 0.5 | 0.3 | 0.1 |
| 100~ | 0.8 | 0.7 | 0.4 | 0.1 |

As can be seen from the table 1, the longer the focal length F1 becomes and the smaller the image magnification $\beta_{ref}$ becomes, the larger the reflection contribution factor $\eta_{ref}$ becomes. In these cases, for example, the object 2 disposed near to the camera body 100 is taken by the taking lens having a long focal length. Thus, the quantity of reflected flash light reflected by the object 2 and entering into the taking lens system 201 becomes larger, so that the reflection contribution factor $\eta_{ref}$ is made larger. Alternatively, the shorter the focal length F1 becomes and the larger the image magnification $\beta_{ref}$ becomes, the smaller the reflection contribution factor n ref becomes. In these cases, for example, the object 2 disposed far from the camera body 100 is taken by the taking lens having a short focal length. Thus, the quantity of reflected flash light reflected by the object 2 and entering into the taking lens system 201 becomes smaller, so that the reflection contribution factor $\eta_{ref}$ is made smaller.

When the reflection contribution factor $\eta_{ref}$ is decided, a compensation value ΔSVref for compensating the film sensitivity SV is calculated by multiplying the averaged value ΔDVave of the distance to the object 2 by the reflection contribution factor $\eta_{ref}$ (Step #107). Furthermore, the compensated film sensitivity SVC used for controlling the exposure is calculated by adding the compensation value ΔSVref to the film sensitivity SV (SVC=SV+Δ SVref=SV+$\eta$ref·ΔDVave) (Step #109).

Returning to the flowchart shown in FIG. 13, when the parameter such as the compensated film sensitivity is calculated, the body controller 301 judges whether the criterion value restriction TTL flash light control mode (restriction mode) is selected or not (Step #43). When the restriction mode is selected (YES in Step #43), the upper limit and the lower limit of the quantity of the flash light in the TTL flash light control mode are calculated (Step #45). Furthermore, the values of the upper limit and the lower limit of the quantity of the flash light are compensated (Step #47). Alternatively, when the restriction mode is not selected (NO in Step #43), the processes in the steps #45 and #47 are skipped.

The upper limit IVCmax and the lower limit IVCmin of the quantity of the flash light are calculated by the following equations (9) and (10). Hereupon, compensation values DVmax and DVmin for compensating the upper limit IVCmax and the lower limit IVCmin are selected from the following tables 2 and 3, when the focal length F1 of the interchangeable lens 200 and a multiple F1·$\beta_{ref}$ of the focal length F1 and the image magnification $\beta_{ref}$ are used as parameters. When the compensated film sensitivity SVC further includes another erroneous factor, it is preferable further to add a compensation value ΔSV showing the error component to the calculated values of the equations (9) and (10).

$$IVCmax = (DVfec + DVmax) + AVC - SVC \quad (9)$$

$$IVCmin = (DVfec + DVmin) + AVC - SVC \quad (10)$$

TABLE 2

F1 ≤ 100 mm

| F1 · β$_{fec}$ | ~0.5 | 0.5~0.7 | 0.7~1.0 | 1.0~1.5 | 1.5~2.5 | 2.5~ |
|---|---|---|---|---|---|---|
| DVmax | 1.3 | 0.8 | 0.7 | 0.5 | 0.3 | 0.2 |
| DVmin | -2.2 | -1.5 | -1.0 | -0.7 | -0.4 | -0.2 |

TABLE 3

F1 > 100 mm

| F1 · β$_{fec}$ | ~0.5 | 0.5~1.3 | 1.3~2.5 | 2.5~4.0 | 4.0~6.0 | 6.0~ |
|---|---|---|---|---|---|---|
| DVmax | 1.8 | 1.2 | 0.8 | 0.6 | 0.4 | 0.2 |
| DVmin | -3.8 | -2.0 | -1.2 | -0.8 | -0.5 | -0.2 |

Figure 18A:
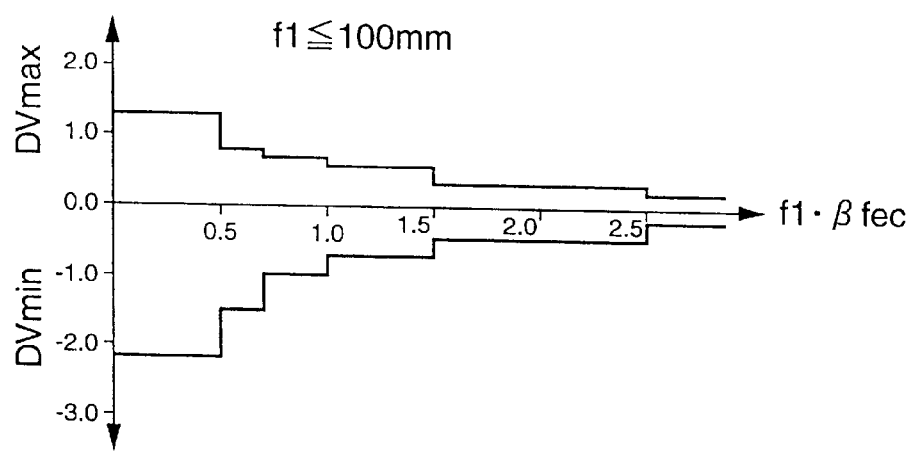
FIGS. 18A and 18B are graphs for showing examples of relation between an upper limit DVmax and a lower limit DVmin of a compensation value for compensating the distance to the object with respect to a value $f1\cdot\beta fec$ in accordance with the embodiment.
Figure 18B:
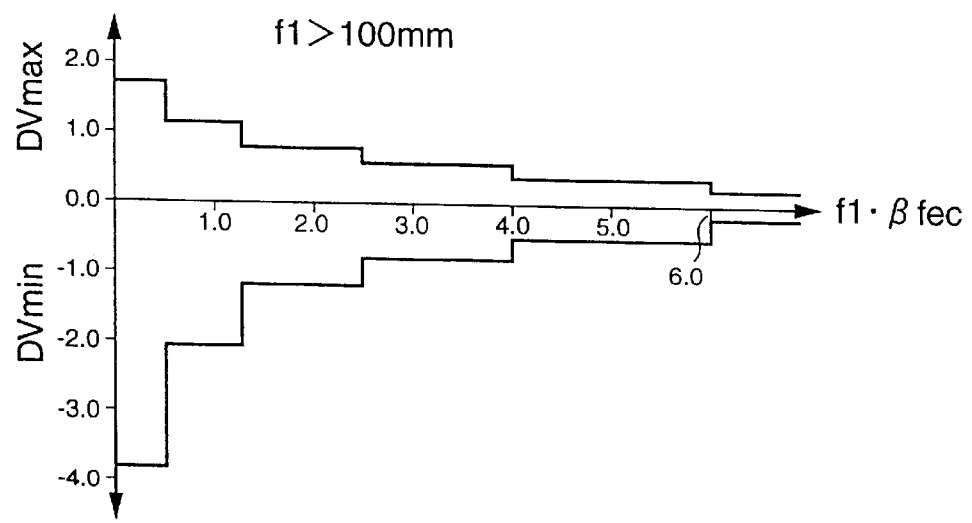
Figure 19A:
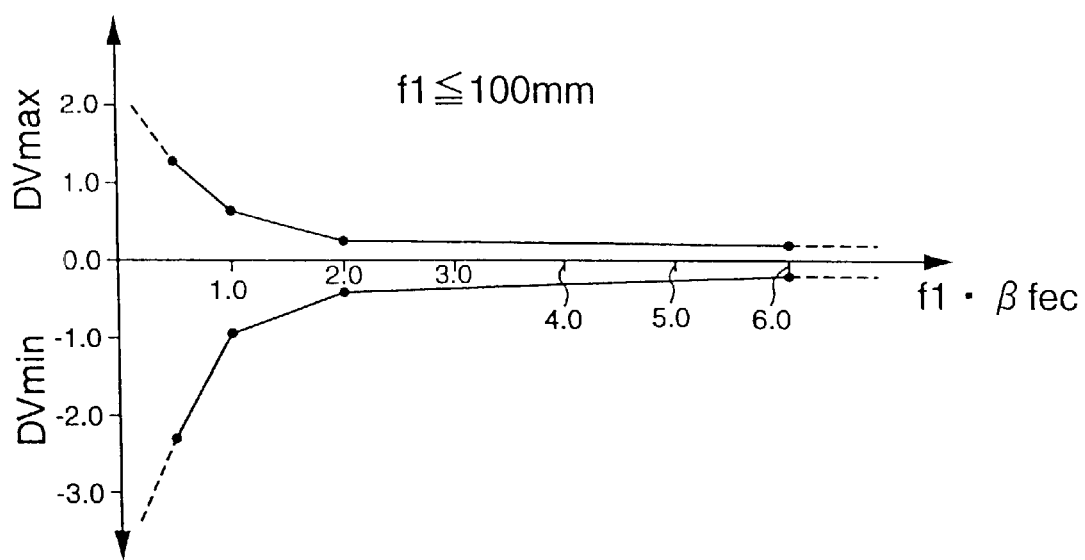
FIGS. 19A and 19B are graphs for showing other examples of the relation between an upper limit DVmax and a lower limit DVmin of the compensation value with respect to the value $f1\cdot\beta fec$ in accordance with the embodiment.
Figure 19B:
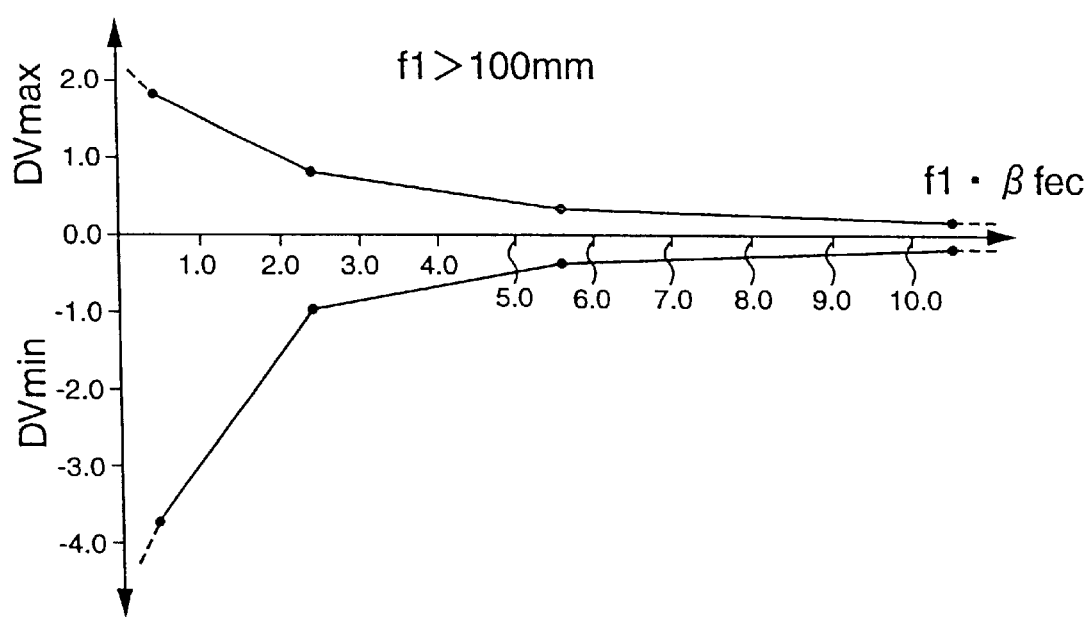

FIG. 18A shows the characteristics of the compensation values DVmax and DVmin of the upper limit IVCmax and the lower limit IVCmin in the table 2, and FIG. 18B shows the characteristics of the compensation values DVmax and DVmin in the table 3. As can be seen from FIGS. 18A and 18B, the characteristics of the compensation values are varied step-wise. It is possible to vary the compensation values DVmax and DVmin as broken lines as shown in FIGS. 19A and 19B. In the examples shown in FIGS. 19A and 19B, the compensation values DVmax and Dvmin are previously decided with respect to a plurality of specific values of F1·β$_{fec}$ as shown in tables 4 and 5. Other compensation values with respect to other values of F1·β$_{fec}$ except the specific values are calculated by linear interpolation. In the latter case shown in FIGS. 19A and 19B and the tables 4 and 5, data number of the compensation values DVmax and DVmin with respect to the values F1·β$_{fec}$ which are memorised in the memory can be reduced.

TABLE 4

F1 ≤ 100 mm

| F1 · β$_{fec}$ | 0.5 | 1.0 | 2.0 | 6.0 |
|---|---|---|---|---|
| DV max | 1.3 | 0.7 | 0.3 | 0.2 |
| DV min | -2.3 | -0.9 | -0.4 | -0.2 |

TABLE 5

F1 > 100 mm

| F1 · β$_{fec}$ | 0.5 | 2.4 | 5.6 | 10.5 |
|---|---|---|---|---|
| DV max | 1.8 | 0.8 | 0.3 | 0.2 |
| DV min | -3.8 | -1.0 | -0.4 | -0.2 |

Compensation of the quantity of the flash light will be described with reference to flowcharts shown in FIGS. 20 to 24. At first, a flag "HOSEI ON F" is reset to be "0" (Step #111). Subsequently, the reflectance information calculated in the step #39, the lens information inputted in the step #3, the flash information inputted in the step #17 and the photographing information inputted in the step #19 are serially checked (Steps #113 to #119).

Figure 21:
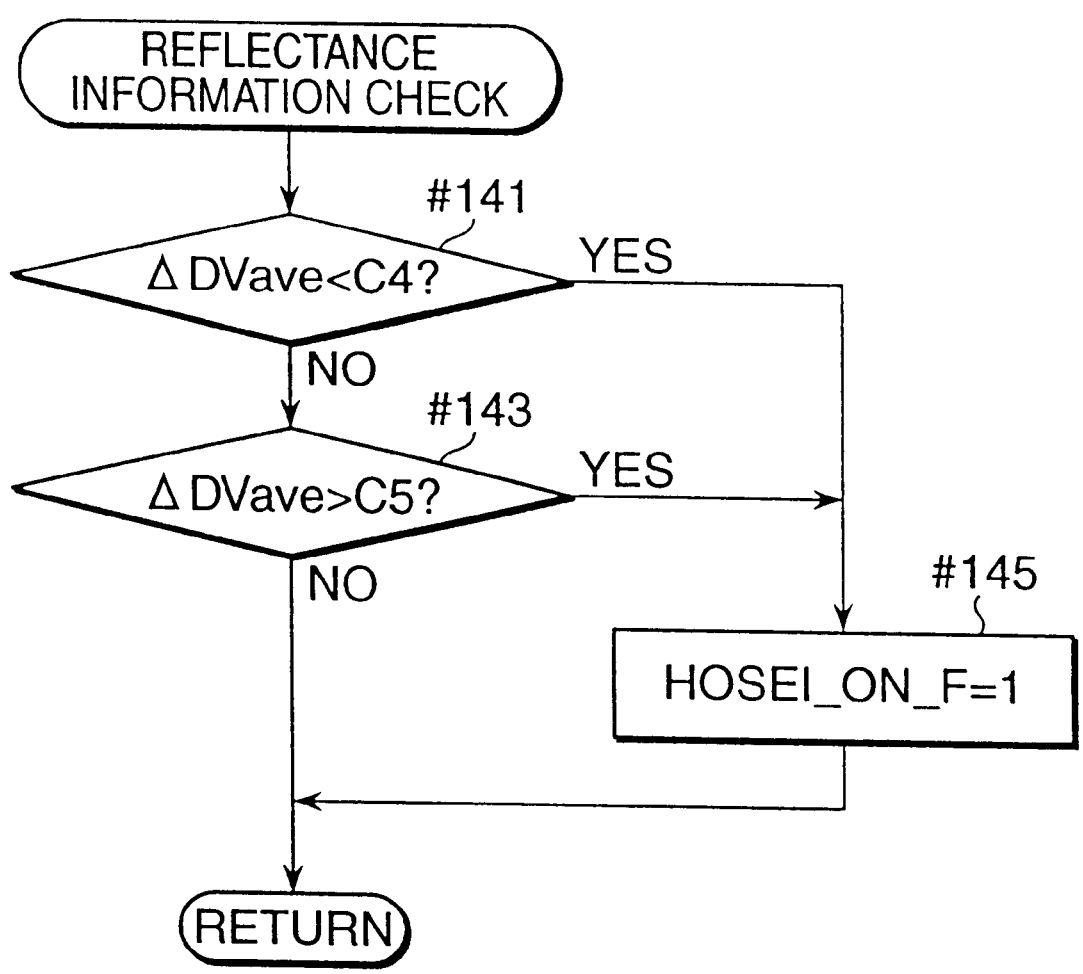
FIG. 21 is a flowchart for showing checking process of a reflectance of the object in accordance with the embodiment.
Figure 22:
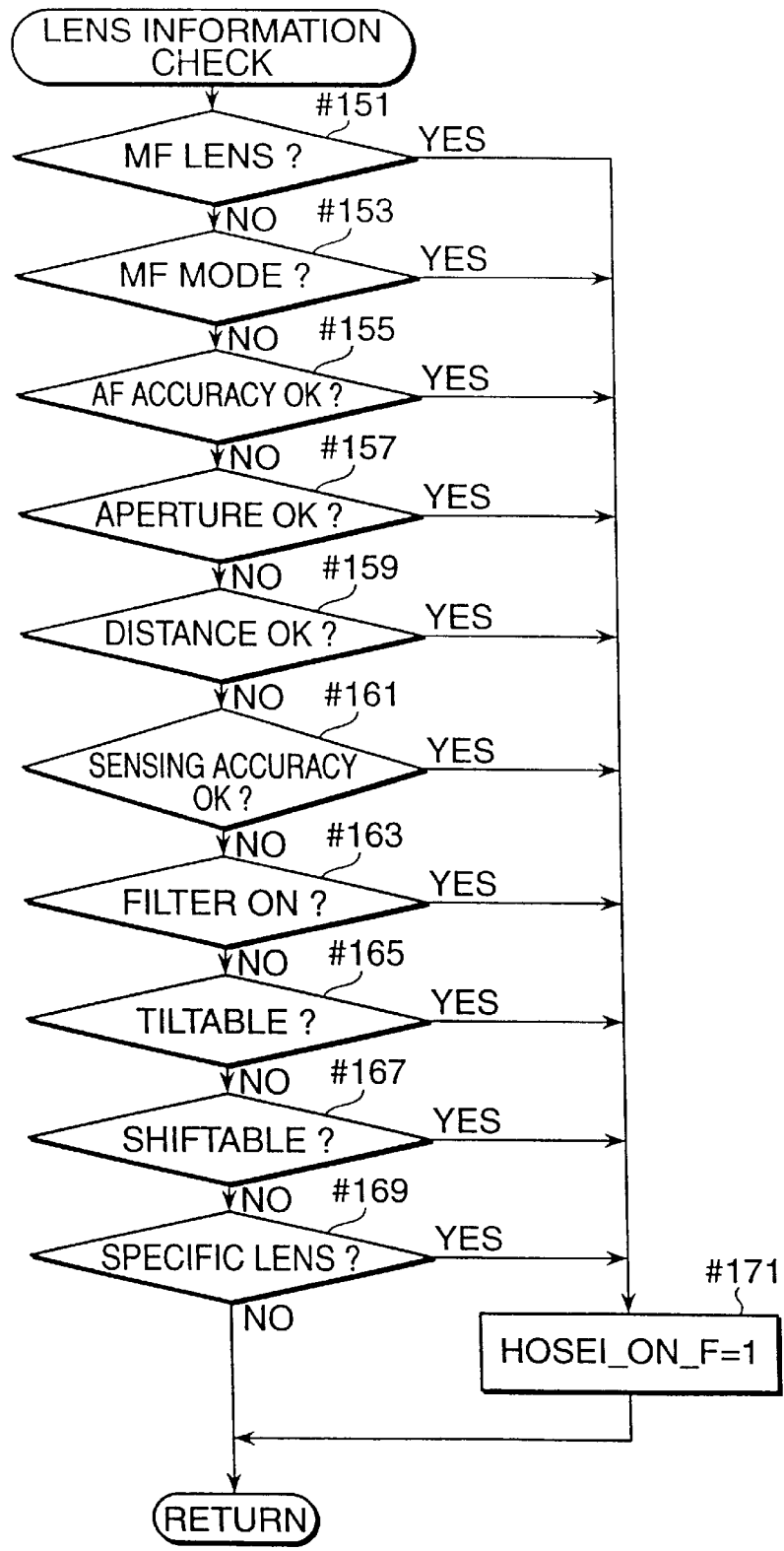
FIG. 22 is a flowchart for showing checking process of lens information in accordance with the embodiment.
Figure 23:
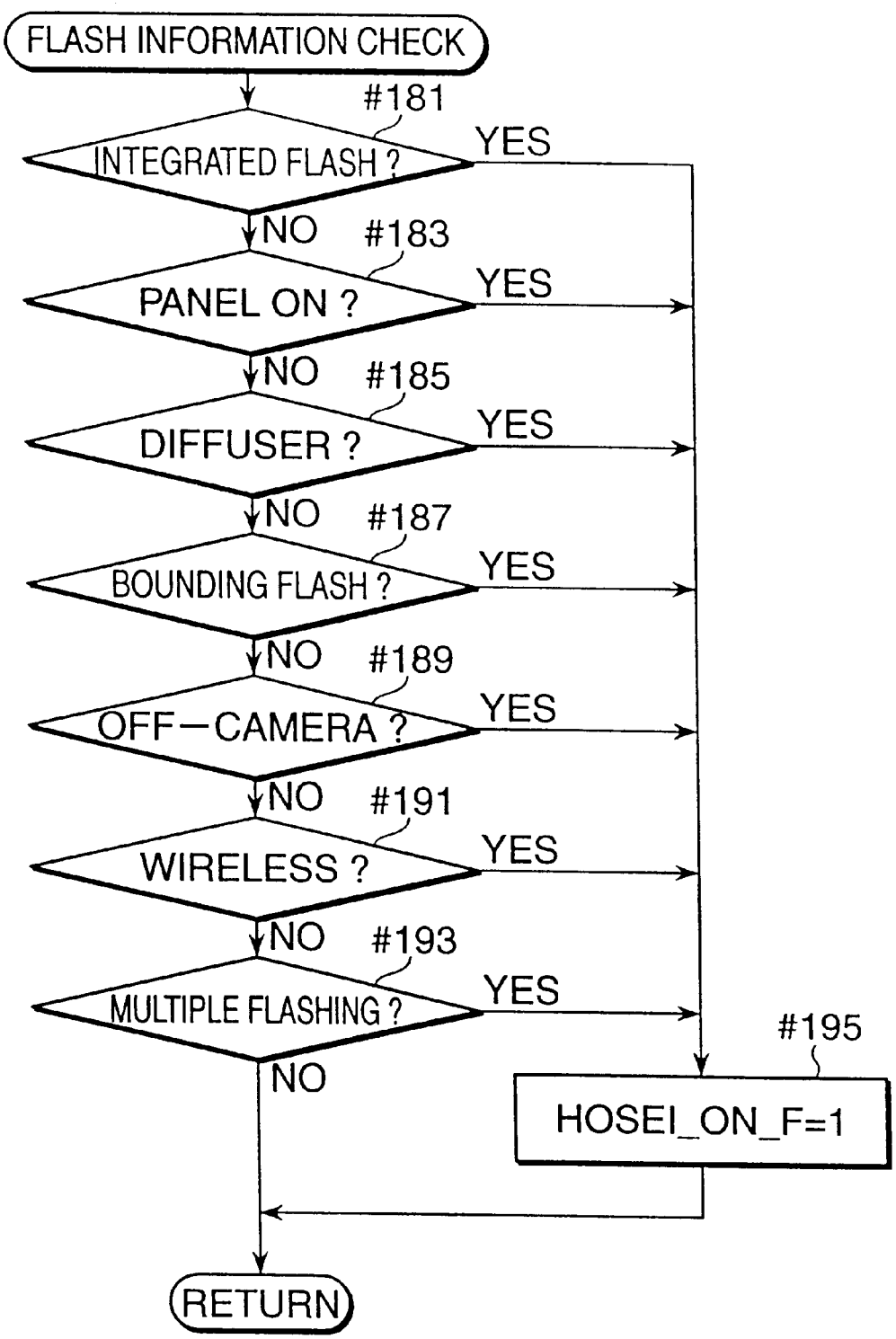
FIG. 23 is a flowchart for showing checking process of information with respect to flash unit or apparatus in accordance with the embodiment.

In the checking of the reflectance information in the step #113, the averaged difference value ΔDVave between the distances to the object with the consideration of the reflectance of the object is judged which of the inequalities of ΔDVave<C4, C4≦ΔDVave<C5, and C5≦ΔDVave is satisfied (Steps #141 and #143 in FIG. 21). Hereupon, C4 is a negative threshold value such as C4=-2.0, and C5 is a positive threshold value such as C5=+3.2. When ΔDVave<C4 or C5≦ΔDVave (YES in Step #141 or #143), the flag "HOSEI ON F" is set to be "1" (Step #145). Alternatively, when C4≦ΔDVave<C5 (NO in Step #143), the flag "HOSEI ON F" is maintained to be In the checking of the lens information in the step #115, the body controller 301 serially judges whether the interchangeable lens 200 is a manual focusing lens (MF lens) or not (Step #151 in FIG. 22), whether the interchangeable lens 200 is selected for manually focused (MF mode) or not when the interchangeable lens 200 is the automatic focusing lens (Step #153), whether the accuracy of the automatic focusing is unavailable (AF accuracy OK) or not (Step #155), whether the accuracy of the aperture control is unavailable (aperture OK) or not (Step #157), whether the distance to the object sensed by the distance encoder 162 is unavailable (distance OK) or not (Step #159), whether the accuracy for sensing the distance to the object is unavailable (sensing accuracy OK) or not (Step #161), whether any optical filter is mounted (filter on) or not (Step #163), whether the interchangeable lens 200 is tiltable or not (Step #165), whether the interchangeable lens 200 is shiftable or not (Step #167), and whether the taking lens system 201 of the interchangeable lens 200 is a specific lens system or not (Step #169).

When the interchangeable lens 200 is the manual focusing lens (YES in Step #151), when the manual focusing mode is selected (YES in Step #153), when the accuracy of the automatic focusing is unavailable (YES in Step #155), when the accuracy of the aperture control is unavailable (YES in Step #157), when the distance to the object is unavailable (YES in Step #159), when the accuracy for sensing the distance to the object is unavailable (YES in Step #161), when an optical filter is mounted (YES in Step #163), when the interchangeable lens 200 is tiltable (YES in Step #165), when the interchangeable lens 200 is shiftable (YES in Step #167), or when the taking lens system 201 is the specific lens system (YES in Step #169), the flag "HOSEI ON F" is set to be "1" (Step #171). Alternatively, when the lens information does not correspond to any of the above-mentioned condition (NO in all Steps #151 to 169), the flag "HOSEI ON F" is maintained to be "0".

In other words, when the interchangeable lens 200 has any erroneous factor by which the distance to the object cannot be sensed precisely, it will affect the accuracy of the quantity of the flash light in the restriction mode. Thus, the flag "HOSEI ON F" which shows the criterion value for restricting the quantity of the flash light in the TTL flash light control be compensated is set to be "1".

In the checking of the flash information in the step #117, the body controller 301 serially judges whether the built-in flash apparatus 170 is used or not (Step #181 in FIG. 23), whether any panel is mounted on the flash apparatus or not (Step #183), whether the diffuser is mounted on the flash apparatus or not (Step #185), whether the bounding flash mode is selected or not (Step #187), whether the flash apparatus is off-camera or not (Step #189), whether the flash apparatus is connected by wireless system or not (Step #191), and whether a plurality of flash apparatus is connected for multiply flashing the object or not (Step #193).

When the built-in flash apparatus 170 is used (YES in Step #181), when any panel is mounted on the flash apparatus (YES in Step #183), when the diffuser is mounted on the flash apparatus (YES in Step #185), when the bound flash mode is selected (YES in Step #187), when the flash apparatus is off-camera (YES in Step #189), when the flash apparatus is connected by wireless system (YES in Step

191), or when a plurality of flash apparatus is connected to the camera (YES in Step #193), the flag "HOSEI ON F" is set to be "1" (Step #195). Alternatively, when the flash information does not correspond to any of the above-mentioned condition (NO in all Steps #181 to 193), the flag "HOSEI ON F" is maintained to be "0".

In other words, when the flash apparatus 170 or 400 has any factor such that the full quantity of the flash light is smaller, or the wide/telescopic panel is mounted in front of the flash apparatus for affecting the quantity of the flash light illuminating the object, the flag "HOSEI ON F" which shows the criterion value for restricting the quantity of the flash light in the TTL flash light control be compensated is set to be "1".

In the checking of the photographing information in the step #119, the body controller 301 serially judges whether the manual focusing mode is selected or not (Step #201 in FIG. 24), whether the self-timer photographing mode is selected or not (Step #203), whether the mirror-up mode is selected or not (Step #205), whether the rear shutter blade synchro-flash mode is selected or not (Step #207), and whether the bracket mode is selected or not (Step #209).

When the manual focusing mode is selected (YES in Step #201), when the self-timer photographing mode is selected (YES in Step #203), when the mirror-up mode is selected (YES in Step #205), when the rear shutter blade synchro-flash mode is selected (YES in Step #207), or when the bracket mode is selected (YES in Step #209), the flag "HOSEI ON F" is set to be "1" (Step #211). Alternatively, when the photographing information does not correspond to any of the above-mentioned condition (NO in all Steps #201 to 209), the flag "HOSEI ON F" is maintained to be "0".

Figure 20:
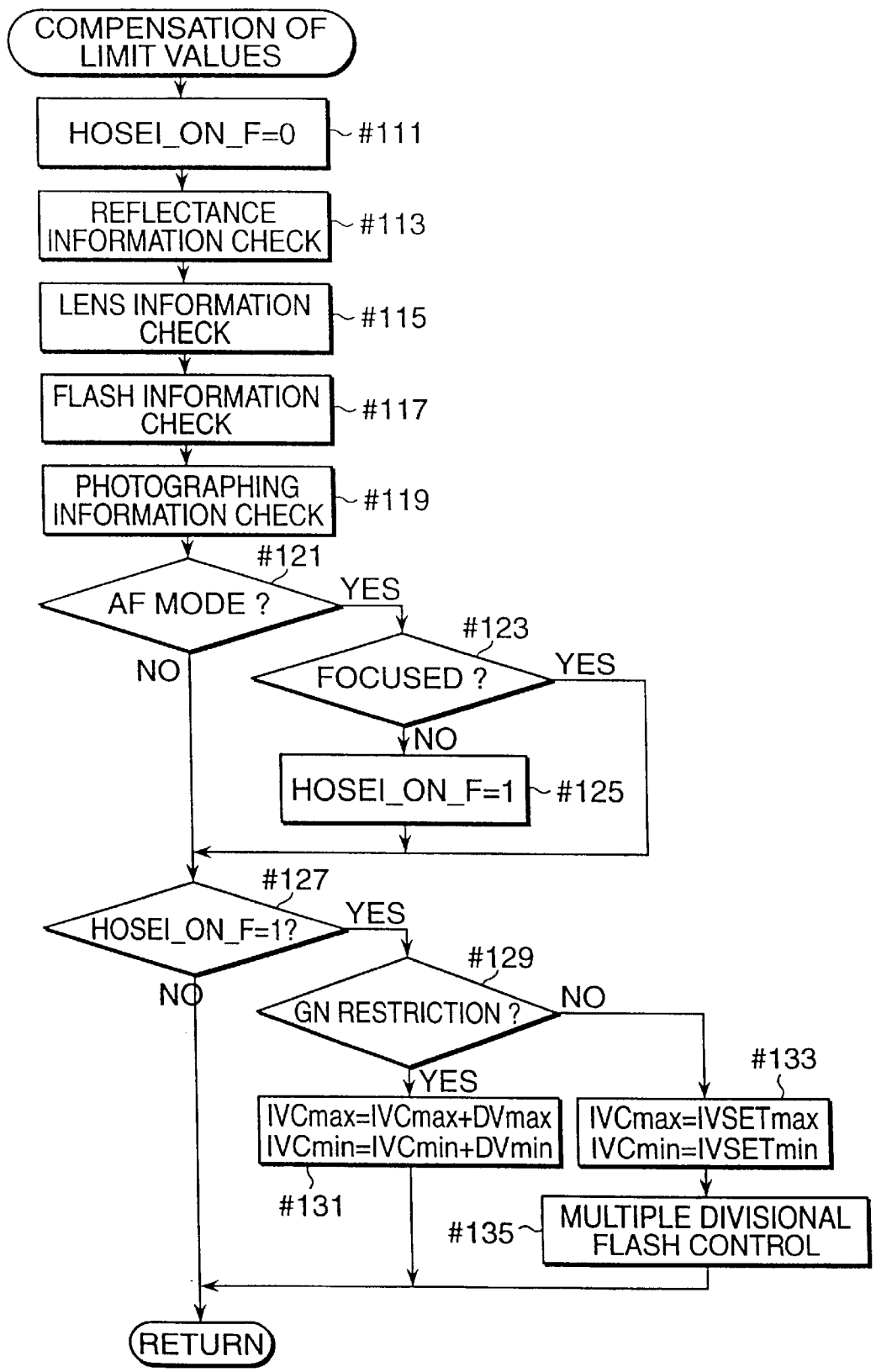
FIG. 20 is a flowchart for showing compensation process of the quantity of the flash light in accordance with the embodiment.

Returning to the flowchart in FIG. 20, when the checking of the reflectance information, the lens information, the flash information and the photographing information is completed, the body controller 301 judges whether the automatic focusing mode is selected or not (Step #121). When the automatic focusing mode is not selected (NO in Step #121), the body controller 301 proceeds corresponding to the value "1" or "0" of the flag "HOSEI ON F" (Step #127).

Alternatively, when the automatic focusing mode is selected (YES in Step #121), the body controller 301 further judges whether the interchangeable lens 200 is in infocus condition or not (Step #123). When the interchangeable lens 200 is not in infocus condition (NO in Step #123), the flag "HOSEI ON F" is set to be "1" (Step #125). Alternatively, when the interchangeable lens 200 is in infocus condition (YES in Steps #123), the flag "HOSEI ON F" is maintained to be "0".

In the step #127, the body controller 301 judges the value of the flag "HOSEI ON F". When the flag "HOSEI ON F" is reset to be "0" (NO in Step #127), it is not necessary to compensate the quantity of the flash light in the TTL flash light control, so that the criterion value is not compensated. Alternatively, when the flag "HOSEI ON F" is set to be "1" (YES in Step #127), the body controller 301 further judges whether the restriction mode is selected or not (Step #129).

When the restriction mode is selected (YES in Step #129), the body controller 301 compensates the upper limit IVCmax and the lower limit IVCmin of the quantity of the flash light by the following equations (11) and (12) (Step #131).

$$IVCmax = IVCmax + DVmax \quad (11)$$

$$IVCmin = IVCmin + DVmin \quad (12)$$

In the equations (11) and (12), the compensated upper limit and lower limit are loosened by adding the compensation values DVmax and DVmin to the original upper limit IVCmax and the lower limit IVCmin.

When the restriction mode is not selected (NO in Step #129), the body controller 301 sets the upper limit IVCmax and the lower limit IVCmin as the maximum quantity of the flash light IVSETmax and IVSETmin which can be controlled by the TTL flash light control (Step #133). The quantity of the flash light in the TTL flash light control is not compensated. Subsequently, the body controller 301 forcible selects the multiply divisional TTL flash light control mode (Step #135).

Returning to the flowchart in FIG. 13, when the compensation of the quantity of the flash light is completed, the body controller 301 prepares shutter release operation (Step #49). When the preparation of the shutter release operation includes, for example, preparation for emitting the flash light, withdrawal of the mirrors 111 and 112, and charge of the shutter unit 130. Simultaneously, the aperture mechanism 207 in the interchangeable lens 200 is driven for taking the aperture value corresponding to the control value AVC (Step #51).

When the aperture mechanism 207 is driven, the shutter unit 130 is driven for opening an exposing window for starting the exposure of the film 1 (Step #53). Simultaneously, the body controller 301 judges whether the flash lighting is necessary or not (Step #55). When the flash lighting is not necessary (NO in Step #55), the body controller 301 starts for counting the exposure time (Step #63). When a predetermined exposure time has been passed, the shutter unit 130 is driven for closing the exposing window so that the exposure of the film 1 is completed (Step #65).

Figure 25:
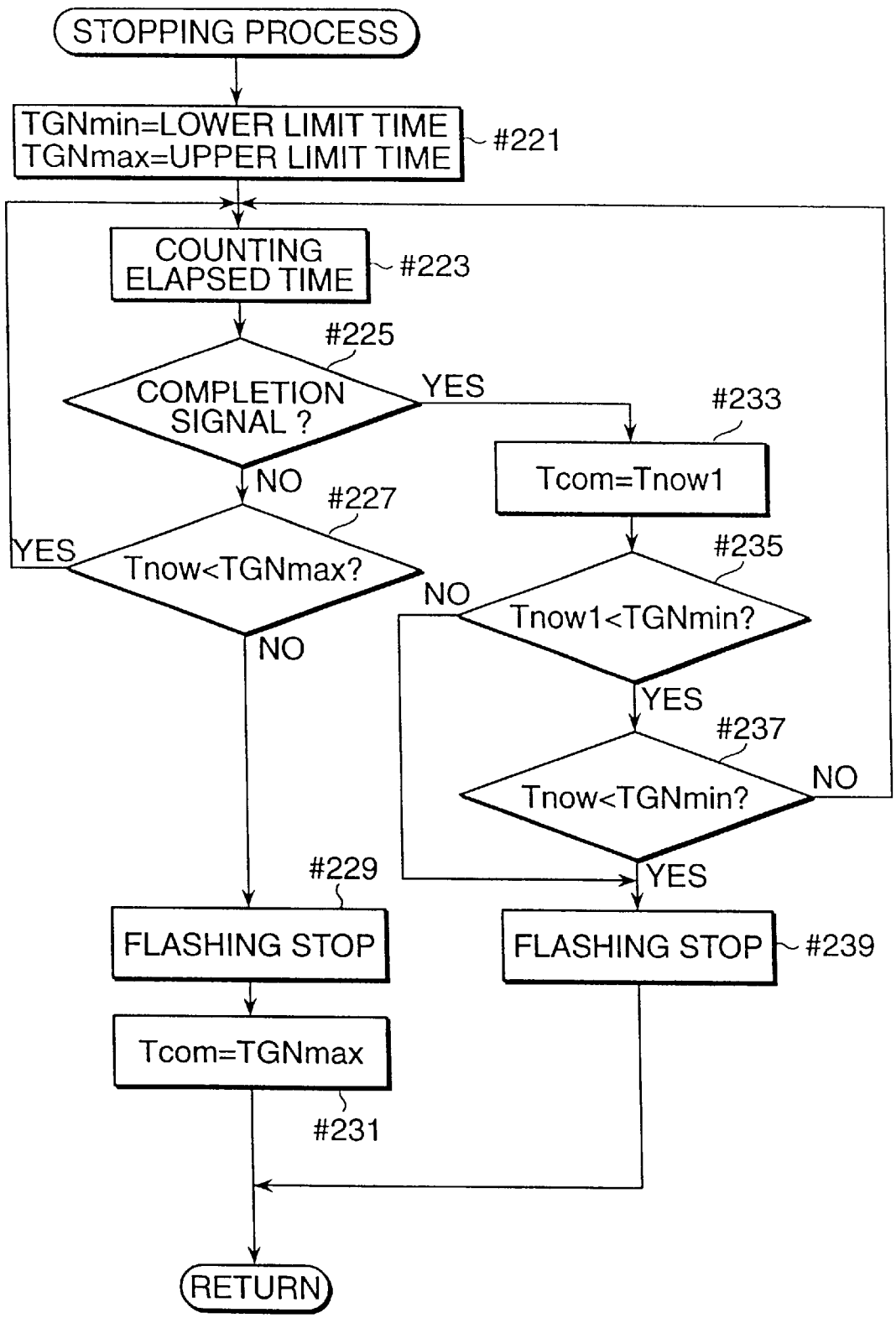
FIG. 25 is a flowchart for showing stopping process of emission of the flash light in accordance with the embodiment.

Alternatively, when the flash lighting is necessary (YES in Step #55), the integration of the flash light sensor 150 (or the integration of quantity of the flash light) is started (Step #57), and the emission of the flash light for illuminating the object is started while the exposing window is fully opened (Step #59). Subsequently, the emission of the flash light is stopped by following the flowchart shown in FIG. 25 (Step #61).

In the stopping operation of the emission of the flash light, an upper limit TGNmax while the flash light has been emitted (hereinafter abbreviated as upper limit time TGNmax) and a lower limit TGNmin while the flash light has been emitted (hereinafter abbreviated as lower limit time TGNmin) are set (Step #221). Simultaneously, an elapsed time Tnow from the start of the integration of the flash light sensor 150 to the current time is renewably counted by a time counter (Step #223).

Subsequently, the body controller 301 judges whether a flash light control completion signal showing that the quantity of the flash light sensed by the flash light sensor 150 reaches to a predetermined value is inputted or not (Step #225). When the flash light control completion signal has not been inputted (NO in Step #225), the body controller 301 further judges whether the upper limit time TGNmax has passed from the start of the integration by the flash light sensor 150 (Step #227). When the upper limit time TGNmax has not passed (NO in Step #227), the body controller 301 repeats the steps #223 to #227 until the upper limit time TGNmax has been passed.

When the upper limit time TGNmax has passed without inputting the flash light control completion signal (NO in Step #225 or #227), the body controller 301 outputs a stop signal for stopping the emission of the flash light to the light emission control circuit 310 or 401 of the flash light to the flash apparatus 170 or 400, so that the emission of the flash light is forcibly stopped (Step #229). The upper limit time TGNmax is set as a flash light control completion time Tcom (Step #231).

Alternatively, when the flash light control completion signal has been inputted until the upper limit time has passed (YES in Step #225), the elapsed time Tnow1 from the start of the integration of the flash light sensor 150 to the time when the flash light control completion signal was inputted is set as the flash light control completion time Tcom (Step #233). The body controller 301 further judges whether judges whether the elapsed time Tnow1 is smaller than the lower limit time TGNmin or not, in other words, whether the flash light control completion signal was inputted before passing the lower limit time TGNmin or not (Step #235).

When the flash light control completion signal was inputted after passing the lower limit time TGNmin (NO in Step #235), the body controller 301 outputs the stop signal to the light emission control circuit 310 or 401 of the flash light to the flash apparatus 170 or 400 at the same time of the input of the flash light control completion signal, so that the emission of the flash light is forcibly stopped (Step #239).

When the flash light control completion signal was inputted before passing the lower limit time TGNmin (YES in Step #235), the body controller 301 further judges whether the elapsed time Tnow from the start of the integration of the flash light sensor 150 to the current time is smaller than the lower limit time TGNmin or not (Step #237). When the elapsed time Tnow from the start of the integration of the flash light sensor 150 to the current time is smaller than the lower limit time TGNmin (NO in Step #237), the body controller 301 repeats the steps #223 to #237 until the lower limit time TGNmin has passed from the start of the emission of the flash light.

When the lower limit time TGNmin has passed from the start of the emission of the flash light (YES in Step #237), the body controller 301 outputs the stop signal to the light emission control circuit 310 or 401 of the flash light to the flash apparatus 170 or 400 at the time when the elapsed time Tnow reaches to the lower limit time TGNmin, so that the emission of the flash light is forcibly stopped (Step #239).

Figure 26:
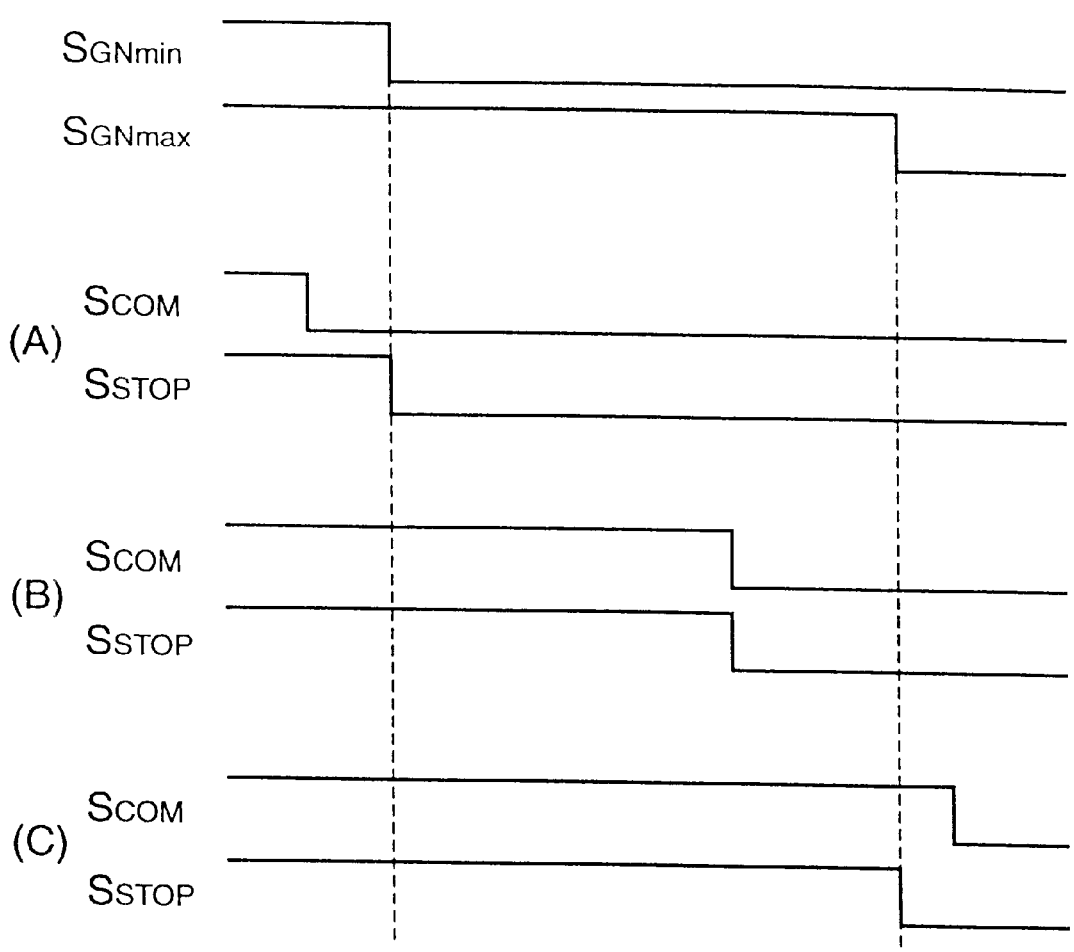
FIG. 26 is a timing chart for showing relations between a stop signal $S_{STOP}$ of the flash light and a flash light control completion signal $S_{COM}$ with respect to detection signals $S_{GNmin}$ and $S_{GNmax}$ showing that the lower limit time and the upper limit time of the emission of the flash light have passed in accordance with the embodiment.

FIG. 26 shows timing charts of the signals in the above-mentioned stopping operation of the emission of the flash light. In FIG. 26, the symbols $S_{GNmin}$ and $S_{GNmax}$ respectively designate the detection signals when the lower limit time TGNmin and the upper limit time TGNmax have passed. The symbol $S_{COM}$ designates the flash light control completion signal. The symbol $S_{STOP}$ designates the stop signal for stopping the emission of the flash light. The falling down of each signal shows the timing of the detection or instruction.

As can be seen from FIG. 26, when the flash light control completion signal $S_{COM}$ is outputted between the detection signals $S_{GNmin}$ and $S_{GNmax}$ (see example (B)), the emission of the flash light is stopped in synchronism with the flash light control completion signal $S_{COM}$. When the flash light control completion signal $S_{COM}$ is outputted before the detection signal $S_{GNmin}$ (see example (A)) or after the detection signal $S_{GNmax}$ (see example (c)), the emission of the flash light is stopped in synchronism with the detection signal $S_{GNmin}$ or $S_{GNmax}$.

Figure 27:
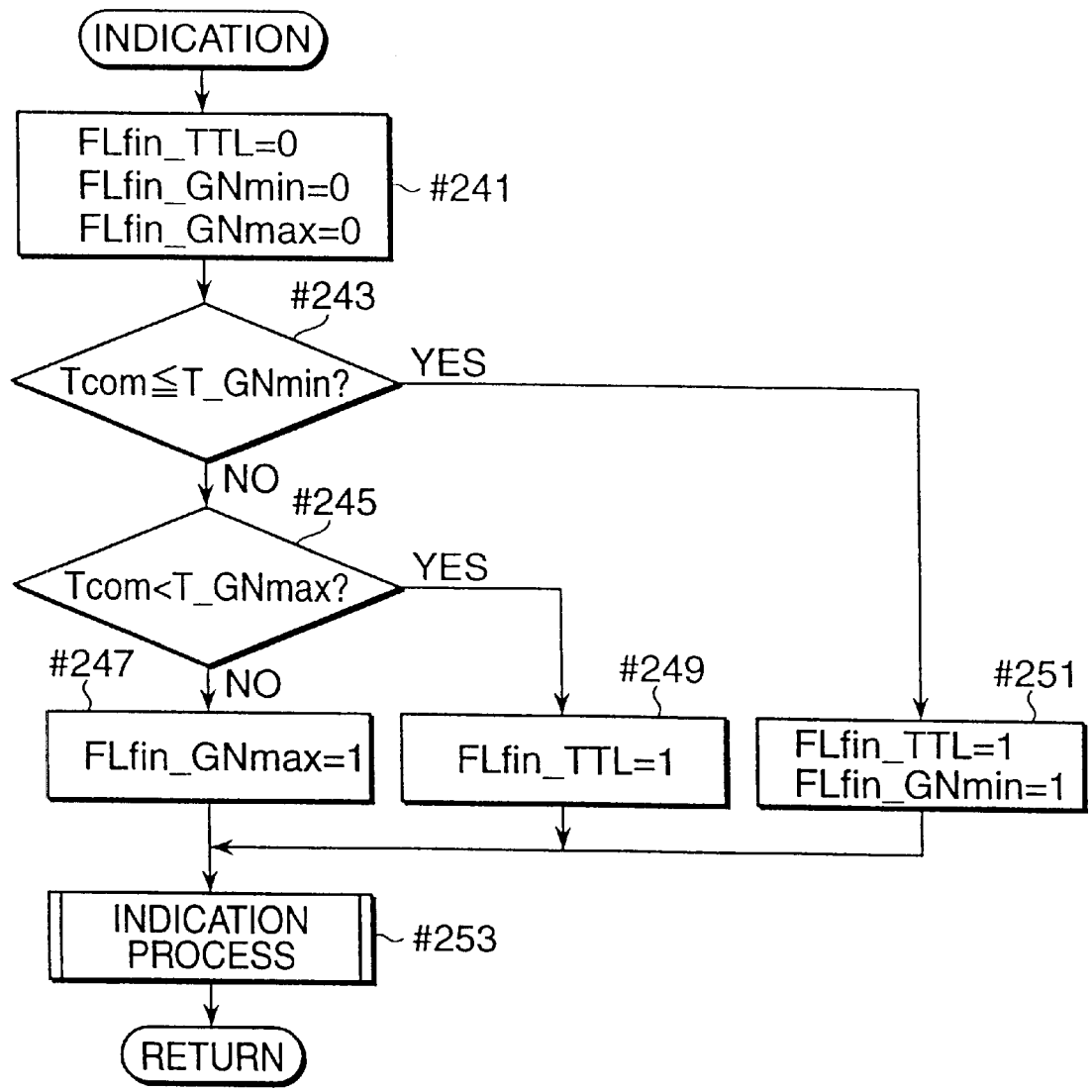
FIG. 27 is a flowchart for showing an example of indication process when the flash light control is completed in accordance with the embodiment.
Figure 28:
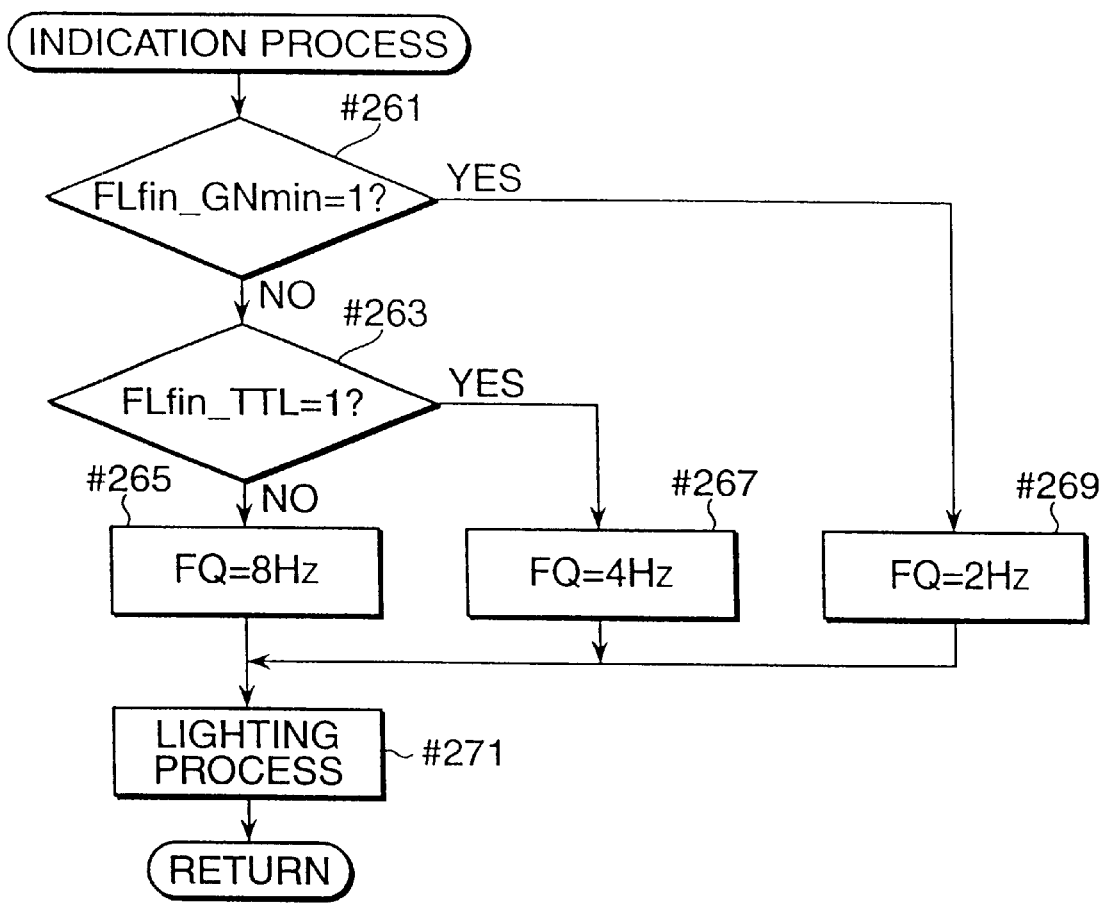
FIG. 28 is a flowchart for showing an example for distinguishing indication method corresponding to flash light control method in accordance with the embodiment.

Returning to the flowchart in FIG. 13, when the exposure of the film has completed, a predetermined indication for showing the flash light control has completed is indicated by following the flowcharts shown in FIGS. 27 and 28 (Step #67). Subsequently, the body controller 301 prepares for next photographing such as the winding of the film 1 and the moving down of the mirrors 111 and 112 (Step #69).

In the flash light control completion process shown in FIG. 27, a flag "FLfin TTL", a flag "FLfin GNmin" and a flag "FLfin GNmax" are reset to be "0" (Step #241). The flag "FLfin TTL" shows that the flash light control has completed at a timing when a signal showing the completion of the TTL flash light control is outputted. The flag "FLfin GNmin" shows that the flash light control has completed at a timing when the lower limit time "TGNmin" has passed. The flag "FLfin GNmax" shows that the flash light control has completed at a timing when the upper limit time "TGNmax" has passed.

The body controller 301 serially judges whether the flash light control completion time Tcom is equal to or smaller than the lower limit time "TGNmin" or not (Step #243), and whether the flash light control completion time Tcom is smaller than the upper limit time "TGNmax" or not (Step #245). When the flash light control completion time Tcom is larger than the lower limit time "TGNmin" and smaller than the upper limit time "TGNmax" (YES in Step #245), the flag "FLfin TTL" is set to be "1" (Step #249). When the flash light control completion time Tcom is equal to or larger than the upper limit time "TGNmax" (NO in Step #245), the flag "FLfin GNmax" is set to be "1" (Step #247). Subsequently, the body controller 301 executes predetermined indication of flash light control completion corresponding to the values of the flags "FLfin TTL", "FLfin GNmin" and "FLfin GNmax" (Step #253).

In the flowchart of the indication process of the flash light control completion in FIG. 28, the body controller 301 judges whether the flag "FLfin GNmin" is set to be "1" (Tcom≦TGNmin) or not (Step #261). When the flag "FLfin GNmin" is set to be "1" (YES in Step #261), the mark 124b for showing the completion of the flash light control (see FIG. 5) is flickeringly lit in the finder display device 124 with a frequency FQ=2 Hz (Steps #269 and #271). When the flag "FLfin GNmin" is set to be "0" (NO in Step #261), the body controller further judges whether the flag "FLfin TTL" is set to be "1" (TGNmin<Tcom<TGNmax) or not (Step #263). When the body controller further judges whether the flag "FLfin TTL" is set to be "1" (YES in Step #263), the mark 124b is flickeringly lit in the finder display device 124 with the frequency FQ=4 Hz (Steps #267 and #271). When the flags "FLfin GNmin" and "FLfin TTL" are set to be "0" (TGNmax≦Tcom) (NO in Step #263), the mark 124b is flickeringly lit in the finder display device 124 with frequency FQ=8 Hz (Steps #265 and #271).

When the color of the indication of the mark 124b cannot be varied, the kind of the flash light control is distinguished by the frequency of the flickering of the indication. In the above-mentioned examples, the longer the time for emitting the flash light is, the higher the frequency of the flickering becomes. Thus, the user can recognize what kind of the flash light control be operated from the frequency of the flickering of the indication.

The indication of the completion of the flash light control is not restricted by the examples. It is possible to make the frequency shorter when the time for emitting the flash light be longer. It is possible to light the indication continuously when the quantity of the flash light is controlled by the normal TTL flash light control, and to light the indication flickeringly when the upper limit and/or lower limit of the quantity of the flash light are/is controlled by the restriction mode control.

When the color of the indication of the mark 124b can be varied as shown in FIG. 7, the indication process of the flash light control completion is executed by following the flowchart shown in FIG. 28. When the flag "FLfin GNmin" is set to be "1" (YES in Step #261), the mark 124b in the finder display device 124 is lit by yellow light (Steps #269' and #271'). When the flag "FLfin GNmin" is set to be "0" and the flag "FLfin TTL" is set to be "1" (YES in Step #263), the mark 124b is indicated by green light (Steps #267' and #271'). When the flags "FLfin GNmin" and "FLfin TTL" are set to be "0" (NO in Step #263), the mark 124b is indicated by red light (Steps #265' and #271').

In this modification, the kind of the flash light control can be distinguished by the color of the indication. The indication of the color for distinguishing the kind of the flash light control is not restricted by the examples. It is possible to provide, for example, red and green LEDs and to distinguish the kind of the flash light control by red, green and combination of red and green.

Figure 30:
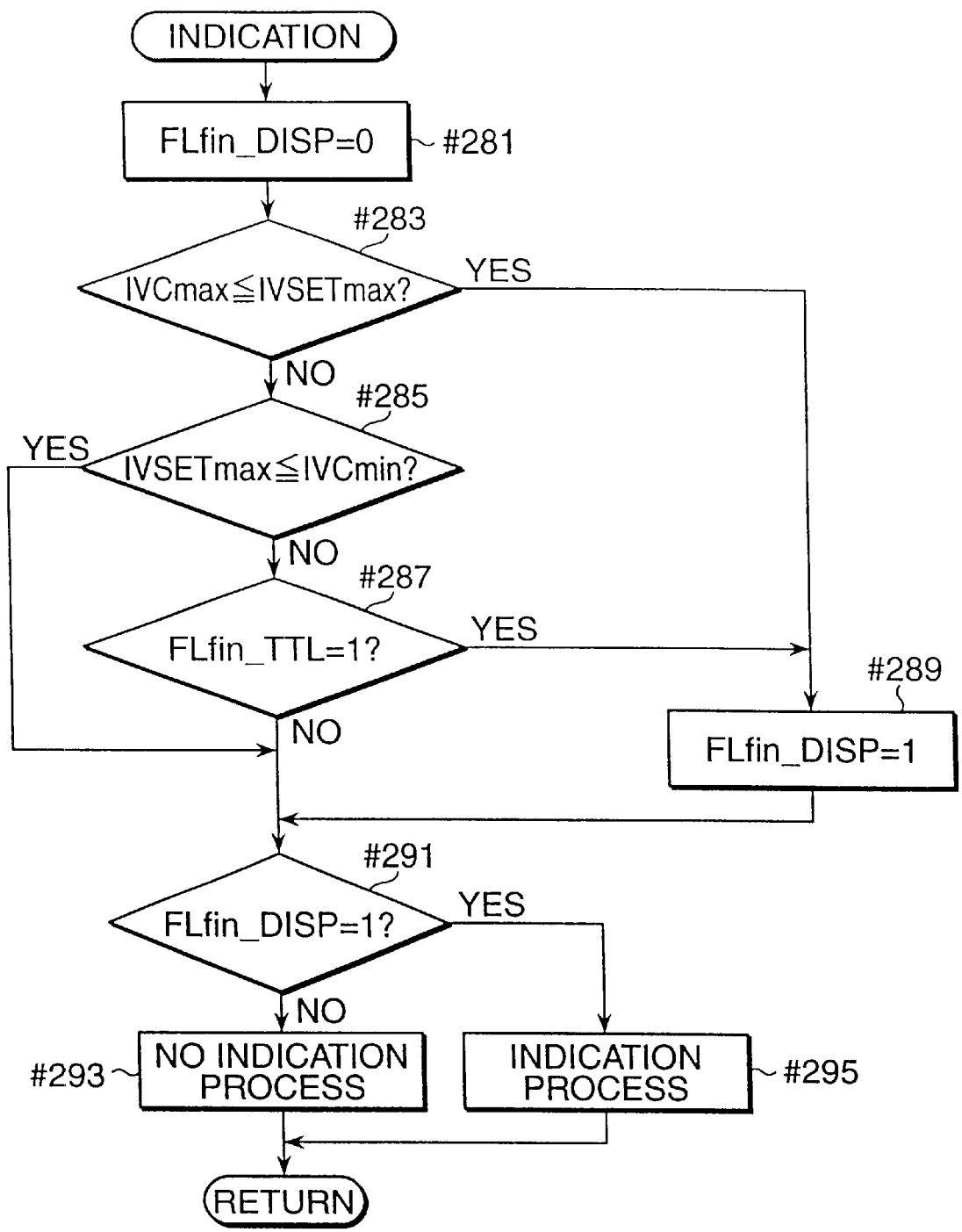
FIG. 30 is a flowchart for showing another example of indication process when the flash light control is completed in accordance with the embodiment.

Still another modification of the indication process of the completion of the flash light control is described with reference to FIGS. 30 and 31A to 31D. FIG. 30 shows a flowchart of the indication process of the completion of the flash light control. FIGS. 31A to 31D show relations between a first light control region W1 from the upper limit IVCmax and the lower limit IVCmin and a second light control region W2 from a maximum quantity IVSETmax and a minimum quantity IVSETmin of the controllable flash light by the flash light control system in this embodiment.

Figure 31A:
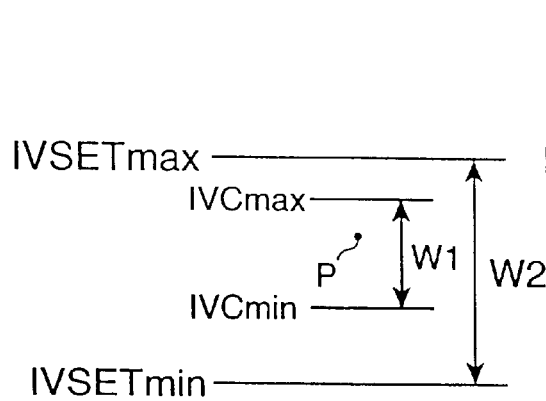
FIGS. 31A to 31D are graphs for showing relations between a first light control region W1 by the upper limit and the lower limit and a second light control region W2 by the maximum quantity and the minimum quantity of the flash light which can be controlled by the flash unit or apparatus in accordance with the embodiment.

FIG. 31A shows a relation when the first light control region W1 is perfectly included in the second light control region W2. In this case, the flash light control can be executed properly, so that the completion process of the flash light control is executed at all time.

Figure 31B:
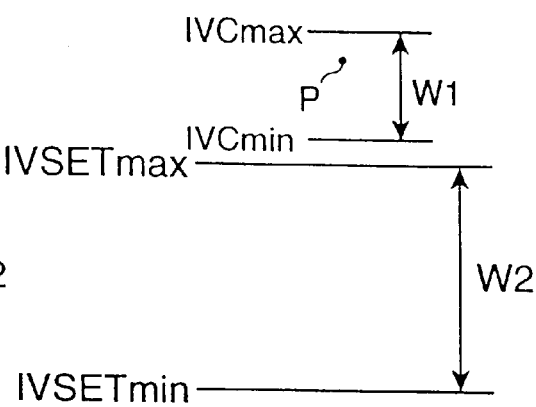

FIG. 31B shows a relation when the first light control region W1 is perfectly out of the second light control region W2. In this case, the flash light control cannot be executed properly, so that the completion process of the flash light control is not executed at all time.

Figure 31C:
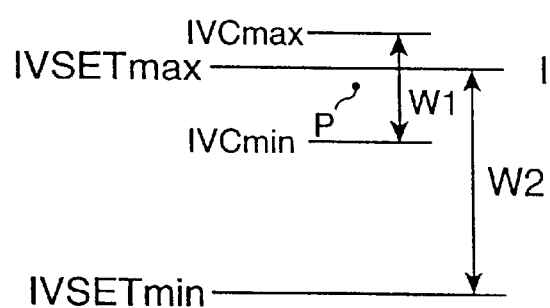

FIG. 31C shows the case that the first light control region W1 is partially included in the second light control region W2, and the quantity P through the TTL flash light control is included in the second light control region W2. In this case, the flash light control can be executed properly, so that the completion process of the flash light control is executed.

Figure 31D:
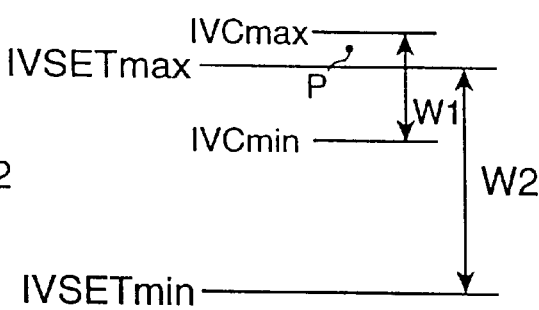

FIG. 31D shows the case that the first light control region W1 is partially included in the second light control region W2, but the quantity P through the TTL flash light control is out of the second light control region W2. In this case, the flash light control cannot be executed properly, so that the completion process of the flash light control is not executed.

In the flowchart shown in FIG. 30, a flag "FLfin DISP" for showing the indication process of the completion of the flash light control be executed is reset to be "0" (Step #281). The body controller 301 judges whether the upper limit IVCmax is equal to or smaller than the maximum quantity IVSETmax of the controllable flash light or not (Step #283). When the upper limit IVCmax is equal to or smaller than the maximum quantity IVSETmax of the controllable flash light (YES in Step #283), it corresponds to the case shown in FIG. 31A, so that the flag "FLfin DISP" is set to be "1" (Step #289).

When the upper limit IVCmax is larger than the maximum quantity IVSETmax of the controllable flash light (NO in Step #283), the body controller 301 further judges whether the lower limit IVCmin is equal to or larger than the maximum quantity of the controllable flash light IVSETmax or not (Step #285). When the lower limit IVCmin is equal to or larger than the maximum quantity IVSETmax of the controllable flash light (YES in Step #285), it corresponds to the case shown in FIG. 31B, so that the body controller 301 proceeds to step #291 without setting the flag "FLfin DISP" to "1".

When the lower limit IVCmin is smaller than the maximum quantity of the controllable flash light IVSETmax (NO in Step #285), the body controller 301 further judges whether the flag "FLfin DISP" is set to be "1", that is the flash light control is properly executed in the maximum quantity IVSETmax of the controllable flash light or not (Step #287). When the flag "FLfin DISP" is set to be "1" (the flash light control is properly executed) (YES in Step #287), it corresponds to the case shown in FIG. 31C, so that the flag "FLfin DISP" is set to be "1" (Step #289). Alternatively, when the flag "FLfin DISP" is not set to be "1" (or the flash light control is improperly executed) (NO in Step #287), it corresponds to the case shown in FIG. 31D, so that the body controller 301 proceeds to step #291 without setting the flag "FLfin DISP" to "1".

Figure 29:
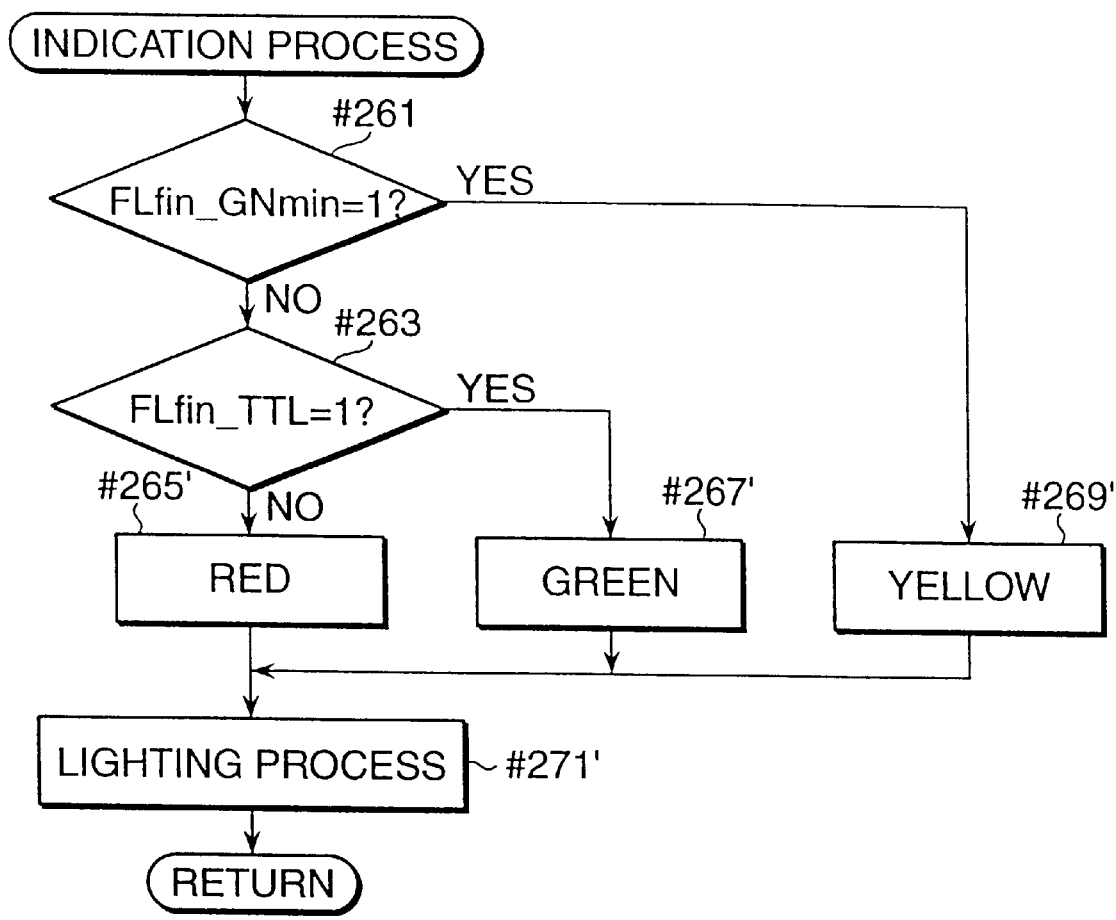
FIG. 29 is a flowchart for showing another example for distinguishing indication method corresponding to flash light control method in accordance with the embodiment.

In the step #291, the body controller 301 judges whether the flag "FLfin DISP" is set to be "1" or not. When the flag "FLfin DISP" is set to be "1" (YES in Step #291), the above-mentioned indication shown in FIG. 28 or 29 is executed (Step #295). Alternatively, when the flag "FLfin DISP" is not set to be "1" (NO in Step #291), the above-mentioned indication shown in FIG. 28 or 29 is not executed (Step #293).

As mentioned above, the information with respect to the parameters which will affect the calculation of the quantity of the flash light in the restriction mode is inputted to the body controller 301 from the lens controller 204 in the interchangeable lens 200, the flash light controller 401 of the exterior type flash apparatus 400 or the switches on the camera body 100. When the reliability of the quantity of the flash light restricted by the criterion value in the flashmatic is lower, the value of the criterion value which is to be used for restricting the quantity of the flash light is compensated or the restriction by the criterion value is released. Thus, the occurrence of the improper flash light control through the automatic flash light control can be reduced as smaller as possible.

Furthermore, the completion of the flash light control can be indicated by several different manner such as different flickering frequencies or different indication colors, so that it is possible the user can recognize the difference of the flash light control manner corresponding to the difference of the indication.

Figure 32:
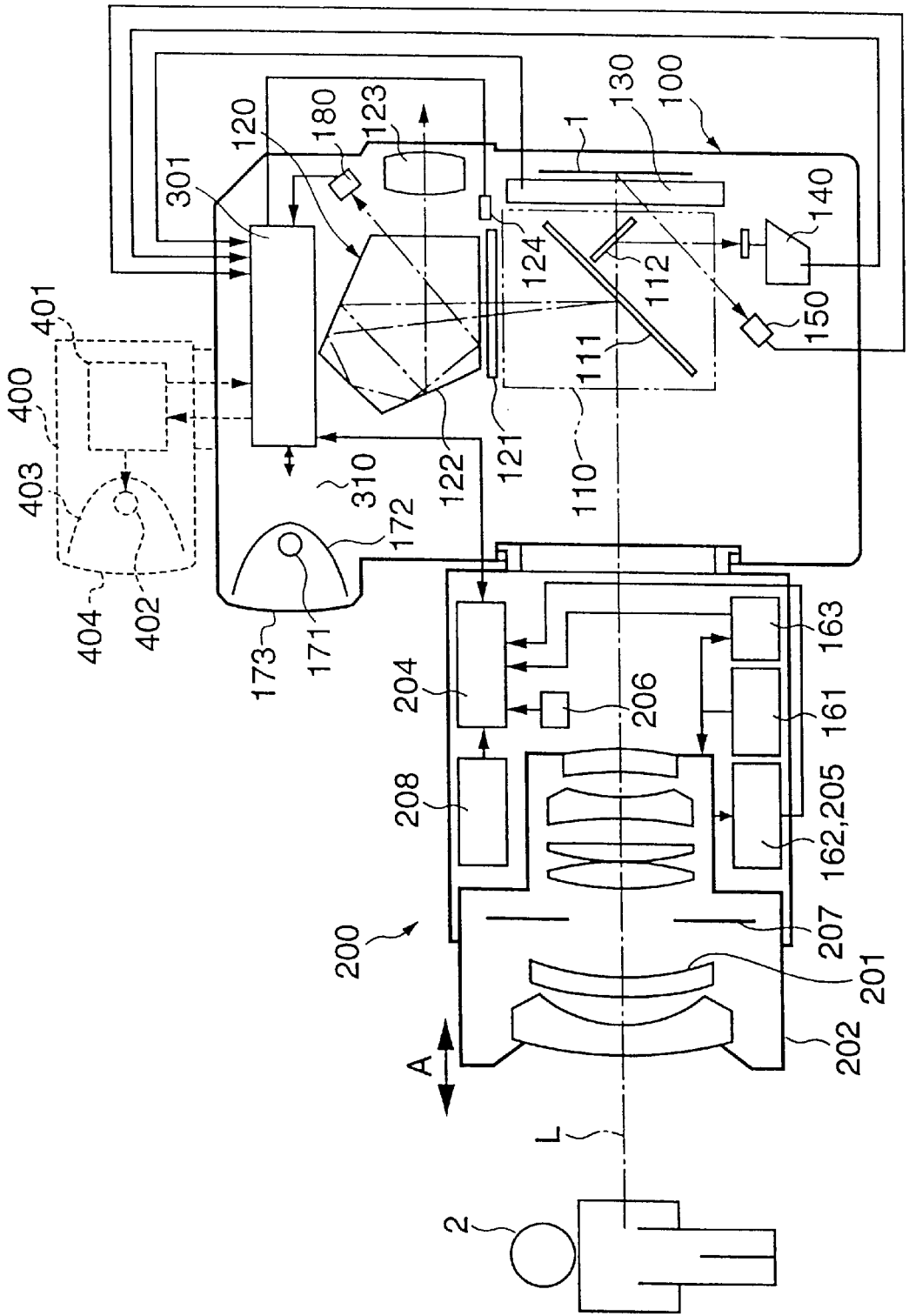
FIG. 32 is a block diagram for showing another configuration of the AF-SLR camera in accordance with the embodiment of the present invention.

Still furthermore, the above-mentioned description refers to the camera in which the driving mechanism and the driving power source for driving the taking lens is provided in the camera body. The present invention, however, can be applied to another type of the camera in which the driving mechanism and the driving power source for driving the taking lens is provided in the taking lens itself as shown in FIG. 32.

Still furthermore, the present invention can be applied to not only a type of a camera using the silver-halide film but also a type of digital camera in which the picture image is taken by an imaging device such as CCD.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
   a light quantity sensor for sensing a quantity of reflected flash light which is emitted from a flash light source, reflected by an object and reaches to a plane to be exposed;
   a flash light controller for controlling a quantity of flash light emitted from the flash light source by stopping emission of the flash light with reference to the quantity of the flash light sensed by the light quantity sensor;

a distance sensor for sensing a distance to the object;

a luminance sensor for sensing a luminance of the object;

an aperture value selector for selecting an aperture value of a taking lens corresponding to the luminance of the object or selection by an operator;

a limit quantity calculator for calculating an upper limit and/or a lower limit of the quantity of the flash light which will be emitted from the flash light source with reference to the distance to the object and the aperture value selected by the aperture value selector;

a quantity restrictor for restricting the quantity of the flash light which will be controlled by the flash light controller corresponding to the upper limit and/or the lower limit of the quantity of the flash light calculated by the limit quantity calculator;

an input unit for inputting parameter information with respect to parameters which will affect an accuracy of the upper limit and/or the lower limit of the quantity of the flash light calculated by the limit quantity calculator; and a compensator for compensating the upper limit and/or the lower limit of the quantity of the flash light calculated by the limit quantity calculator corresponding to the parameter information.

2. The camera in accordance with claim 1, wherein the parameter information is an information with respect to a reflectance of the object.

3. The camera in accordance with claim 2, wherein the input unit includes a reflectance calculator for calculating the reflectance of the object with reference to a distance to the object sensed by the distance sensor and a quantity of flash light sensed by the light quantity sensor when a predetermined quantity of the flash light is previously emitted from the flash light source.

4. The camera in accordance with claim 3, wherein the compensator compensates the upper limit and/or the lower limit of the quantity of the flash light when the reflectance of the object is larger than a predetermined threshold value.

5. The camera in accordance with claim 3, wherein the compensator compensates the upper limit and/or the lower limit of the quantity of the flash light when the reflectance of the object is smaller than a predetermined threshold value.

6. The camera in accordance with claim 1, wherein the parameter information is an information with respect to an illumination by the flash light source for illuminating the object.

7. The camera in accordance with claim 6, wherein the information with respect to the illumination by the flash light source is an information whether a panel for varying illumination angle of flash light is mounted on the flash light source or not.

8. The camera in accordance with claim 6, wherein the information with respect to the illumination by the flash light source is an information of a position of the flash light source with respect to the camera.

9. The camera in accordance with claim 6, wherein the information with respect to the illumination by the flash light source is an information of a number of the flash light source(s).

10. The camera in accordance with claim 6, wherein the information with respect to the illumination by the flash light source is an information of an illumination angle of the flash light source with respect to the object.

11. The camera in accordance with claim 6, wherein the information with respect to the illumination by the flash light source is an information whether the flash light source is built in the camera or exteriorly mounted on the camera.

12. The camera in accordance with claim 1, wherein the parameter information is an information with respect to the detection of the distance to the object.

13. The camera in accordance with claim 12, wherein the information with respect to the detection of the distance to the object is an information whether a focus of a taking lens is controlled by an automatic focusing mechanism or a manual focusing mechanism.

14. The camera in accordance with claim 13, wherein the compensator compensates the upper limit and/or the lower limit of the quantity of the flash light when the focus of the taking lens is controlled by the manual focusing mechanism.

15. The camera in accordance with claim 12, wherein the information with respect to the detection of the distance to the object is an information of accuracy for sensing the distance to the object.

16. The camera in accordance with claim 15, wherein the accuracy for sensing the distance to the object is the accuracy of the distance sensor for sensing the distance to the object.

17. The camera in accordance with claim 15, wherein the accuracy for sensing the distance to the object is the accuracy of the focusing of the taking lens after the focusing operation.

18. The camera in accordance with claim 1, wherein the parameter information is an information with respect to a kind of a taking lens mounted on the camera.

19. The camera in accordance with claim 18, wherein the information with respect to the kind of the taking lens is an information whether the driving region of the taking lens is restricted during focusing or not.

20. The camera in accordance with claim 18, wherein the information with respect to the kind of the taking lens is an information whether the taking lens includes a specific lens system or not.

21. The camera in accordance with claim 18, wherein the information with respect to the kind of the taking lens is an information whether any optical element for changing an optical characteristic of a lens is mounted on the taking lens or not.

22. The camera in accordance with claim 1 further comprising a mode selector for selecting one of a first mode for compensating the upper limit and/or the lower limit of the quantity of flash light emitted from the flash light source and a second mode not for restricting the quantity of the flash light by the upper limit and the lower limit, and wherein the compensator compensates the quantity of the flash light which will be emitted from the flash light source by the upper limit and/or the lower limit.

23. The camera in accordance with claim 1, wherein the compensation of the upper limit and/or the lower limit of the quantity of the flash light includes the case that the quantity of the flash light is not restricted by the upper limit and/or the lower limit.

24. A camera comprising:

a light quantity sensor for sensing a quantity of reflected flash light which is emitted from a flash light source, reflected by an object and reaches to a plane to be exposed;

a flash light controller for controlling a quantity of flash light emitted from the flash light source by stopping emission of the flash light with reference to the quantity of the flash light sensed by the light quantity sensor;

a distance sensor for sensing a distance to the object;

a luminance sensor for sensing a luminance of the object;

an aperture value selector for selecting an aperture value of a taking lens corresponding to the luminance of the object or selection by an operator;

a limit quantity calculator for calculating an upper limit and/or a lower limit of the quantity of the flash light which will be emitted from the flash light source with reference to the distance to the object and the aperture value selected by the aperture value selector;

a quantity restrictor for restricting the quantity of the flash light which will be controlled by the flash light controller corresponding to the upper limit and/or the lower limit of the quantity of the flash light calculated by the limit quantity calculator;

a display device for indicating that the flash light control has completed; and a display controller for indicating a first indication on the display device when the emission of the flash light is stopped without any restriction by the quantity restrictor, and for indicating a second indication different from the first indication on the display device when the emission of the flash light is stopped with a restriction by the quantity restrictor.

25. The camera in accordance with claim 24, wherein indication manner of the second indication is varied correspondingly whether the restriction by the quantity restrictor is caused by the upper limit or the lower limit.

26. A camera comprising:

a light quantity sensor for sensing a quantity of reflected flash light which is emitted from a flash light source, reflected by an object and reaches to a plane to be exposed;

a flash light controller for controlling a quantity of flash light emitted from the flash light source by stopping emission of the flash light with reference to the quantity of the flash light sensed by the light quantity sensor;

a distance sensor for sensing a distance to the object;

a luminance sensor for sensing a luminance of the object;

an aperture value selector for selecting an aperture value of a taking lens corresponding to the luminance of the object or selection by an operator;

a limit quantity calculator for calculating an upper limit and/or a lower limit of the quantity of the flash light which will be emitted from the flash light source with reference to the distance to the object and the aperture value selected by the aperture value selector;

a quantity restrictor for restricting the quantity of the flash light which will be controlled by the flash light controller corresponding to the upper limit and/or the lower limit of the quantity of the flash light calculated by the limit quantity calculator;

a display device for indicating that the flash light control has completed;

a first judger for judging whether the upper limit and/or the lower limit is larger and/or smaller than a predetermined quantity of the flash light;

a second judger for judging whether the quantity of the flash light controlled by the flash light controller is larger or smaller than the predetermined quantity of the flash light; and a display controller for controlling the indicating on the display device corresponding to results of the judgment by the first judger and the second judger.

27. The camera in accordance with claim 26, wherein the predetermined quantity of the flash light is a maximum quantity of the flash light which can be emitted from the flash light source.

28. The camera in accordance with claim 27, wherein the display controller indicates the indication that the flash light control has completed when the upper limit of the quantity of the flash light is smaller than the predetermined quantity of the flash light.

29. The camera in accordance with claim 27, wherein the display controller does not indicate the indication that the flash light control has completed when the lower limit of the quantity of the flash light is larger than the predetermined quantity of the flash light.

30. The camera in accordance with claim 27, wherein the display controller indicates the indication that the flash light control has completed when the predetermined quantity of the flash light is in a region between the upper limit and the lower limit of the quantity of the flash light and the quantity of the flash light controlled by the flash light controller is smaller than the predetermined quantity of the flash light.

* * * * *

UNITED STATES PATENT AND TRADEMARK OFFICE
CERTIFICATE OF CORRECTION

PATENT NO. : 6,577,820 B2  Page 1 of 1
DATED : June 10, 2003
INVENTOR(S) : Motoshi Yamaguchi et al.

It is certified that error appears in the above-identified patent and that said Letters Patent is hereby corrected as shown below:

Drawings,

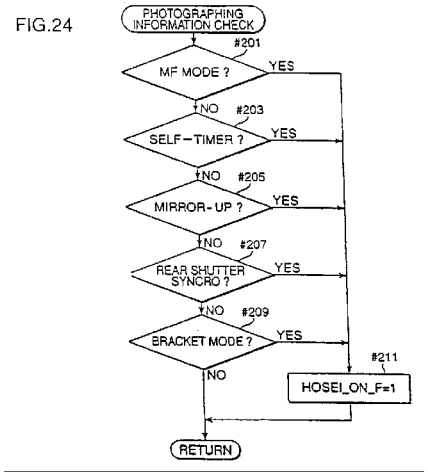

Figure 24:
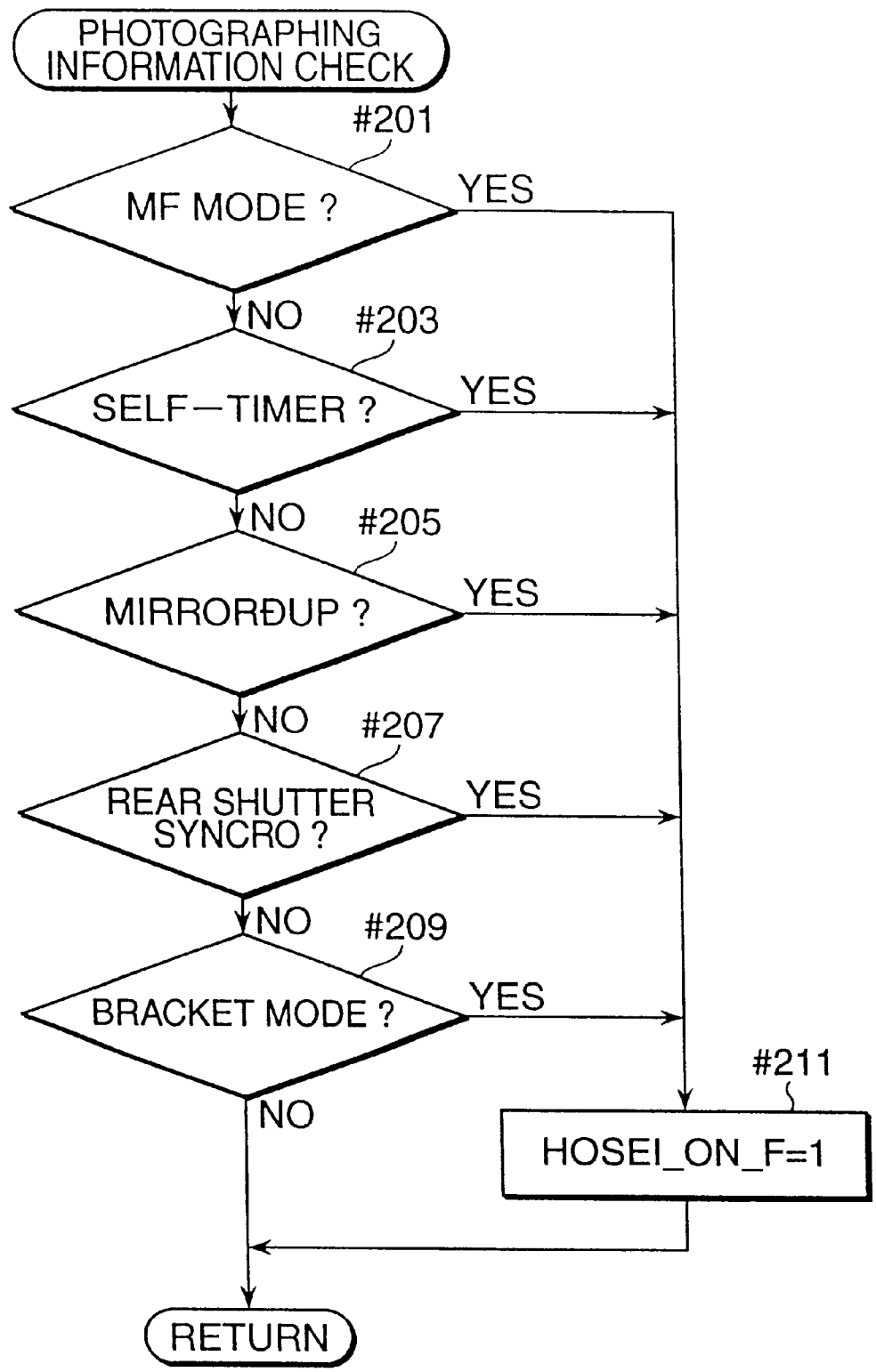
FIG. 24 is a flowchart for showing checking process of information with respect to photographing mode in accordance with the embodiment.

Delete FIG. 24 in its entirety and replace it with the above.

Signed and Sealed this

Twentieth Day of April, 2004

JON W. DUDAS
*Acting Director of the United States Patent and Trademark Office*